(12) United States Patent
Ono

(10) Patent No.: US 12,498,728 B2
(45) Date of Patent: Dec. 16, 2025

(54) CONTROL SYSTEM AND CONTROL METHOD

(71) Applicant: SONY GROUP CORPORATION, Tokyo (JP)

(72) Inventor: Hideyuki Ono, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/503,694

(22) Filed: Nov. 7, 2023

(65) Prior Publication Data

US 2024/0069567 A1    Feb. 29, 2024

Related U.S. Application Data

(63) Continuation of application No. 16/639,219, filed as application No. PCT/JP2018/019666 on May 22, 2018, now Pat. No. 11,846,951.

(30) Foreign Application Priority Data

Aug. 24, 2017    (JP) .................................. 2017-161256

(51) Int. Cl.
    *G06Q 10/047*    (2023.01)
    *G01C 21/34*    (2006.01)
    (Continued)

(52) U.S. Cl.
    CPC ....... *G05D 1/0276* (2013.01); *G01C 21/3407* (2013.01); *G06Q 10/047* (2013.01);
    (Continued)

(58) Field of Classification Search
    CPC ............. G06Q 10/047; G06Q 10/0833; G06Q 10/08355
    See application file for complete search history.

(56) References Cited

U.S. PATENT DOCUMENTS 9,256,852 B1    2/2016  Myllymaki
10,068,486 B1   9/2018  Bar-Zeev et al.
(Continued)

FOREIGN PATENT DOCUMENTS

JP          6164599 B1      7/2017
WO       2019/023686 A1    1/2019

OTHER PUBLICATIONS

Mathew, Neil et al.; "Planning Paths for Package Delivery in Heterogeneous Multirobot Teams"; Published Oct. 2015; IEEE Transactions on Automation Science and Engineering, vol. 12, No. 4; publication pp. 1298-1308 (Year: 2015).*

(Continued)

*Primary Examiner* — Resha Desai
*Assistant Examiner* — Michael C Moroney
(74) *Attorney, Agent, or Firm* — CHIP LAW GROUP

(57) ABSTRACT

There is provided a control system and a control method that can improve the convenience of delivery service by reducing the number of redeliveries by using an automatic home delivery locker vehicle that goes around in a region. A control system that manages running of an automatic driving home delivery locker going around in a specified region by automatic driving, the control system includes a communication unit that receives notification showing that the automatic driving home delivery locker has received a home delivery article and a control unit that controls such that an inquiry is made to a terminal device of a consignee of the home delivery article via the communication unit in accordance with reception of the notification so as to estimate a current position of the consignee.

10 Claims, 19 Drawing Sheets

(51) Int. Cl.
*G05D 1/00* (2024.01)
*G06Q 10/0833* (2023.01)
*G06Q 10/0836* (2023.01)

(52) U.S. Cl.
CPC ..... *G06Q 10/0833* (2013.01); *G06Q 10/0836* (2013.01); *G05D 1/0088* (2013.01)

(56) References Cited

U.S. PATENT DOCUMENTS

| | | | |
|---|---|---|---|
| 10,181,111 B1 | 1/2019 | Kohli et al. | |
| 10,233,021 B1* | 3/2019 | Brady | G06Q 10/0832 |
| 10,255,577 B1* | 4/2019 | Steves | G05D 1/646 |
| 10,308,430 B1* | 6/2019 | Brady | G06Q 10/083 |
| 10,463,095 B2 | 11/2019 | Shaffer et al. | |
| 10,643,171 B1 | 5/2020 | Zhang | |
| 10,860,967 B2* | 12/2020 | Wilkinson | G06Q 10/083 |
| 11,423,350 B2 | 8/2022 | Wiechers | |
| 2003/0146854 A1* | 8/2003 | Jones | G06Q 10/08 340/988 |
| 2008/0201244 A1 | 8/2008 | Johnson | |
| 2010/0131407 A1* | 5/2010 | Folk | G06Q 20/10 705/39 |
| 2014/0330456 A1 | 11/2014 | Lopez et al. | |
| 2015/0120094 A1 | 4/2015 | Kimchi et al. | |
| 2015/0379468 A1 | 12/2015 | Harvey | |
| 2016/0379167 A1* | 12/2016 | Raman | G06Q 10/1097 705/338 |
| 2017/0050747 A1* | 2/2017 | Wessler | B64D 47/06 |
| 2017/0098188 A1 | 4/2017 | Aryeetey et al. | |
| 2017/0255896 A1* | 9/2017 | Van Dyke | A47G 29/141 |
| 2017/0330144 A1* | 11/2017 | Wakim | G06Q 10/083 |
| 2018/0058864 A1* | 3/2018 | Lection | G01C 21/3415 |
| 2018/0096287 A1* | 4/2018 | Senger | G06Q 10/08 |
| 2018/0121878 A1 | 5/2018 | Bostick et al. | |
| 2018/0158018 A1 | 6/2018 | Luckay et al. | |
| 2018/0204030 A1* | 7/2018 | Bruce | G06K 19/07758 |
| 2018/0253691 A1* | 9/2018 | High | G06Q 30/0641 |
| 2019/0004539 A1 | 1/2019 | Yu et al. | |
| 2019/0011926 A1* | 1/2019 | Konishi | G01C 21/3476 |
| 2019/0012625 A1* | 1/2019 | Lawrenson | G06Q 10/06311 |
| 2019/0019149 A1 | 1/2019 | Dixon et al. | |
| 2019/0041864 A1 | 2/2019 | Konishi et al. | |
| 2019/0050952 A1* | 2/2019 | Goldberg | G06Q 10/087 |
| 2020/0174494 A1* | 6/2020 | Lessels | G06Q 10/083 |

OTHER PUBLICATIONS

Jeremy Kahn, "Droids Not Drones Are the Future of E-commerce Deliveries", Mint, URL: https://www.bloomberg.com/news/articles/2016-04-18/ droids-not-drones-are-the-future-of-e-commerce-deliveries., Apr. 19, 2016, pp. 1-8.

International Preliminary Report on Patentability of PCT Application No. PCT/JP2018/019666, issued on Mar. 5, 2020, 07 pages of English Translation and 03 pages of IPRP.

The "MaaS" Era where all Industries would Change, Autonomous Driving Becomes a Service, Nikkei Business, No. 1856, Sep. 5, 2016, 08 pages.

Partners Wanted for Demonstration Experiment of the Home Delivery Robot Carriro Express, ZMP Inc, May 18, 2017, 02 pages.

Logistics support with autonomous moving robot cart and the possibility of "unmanned home delivery with robot car", Material Flow, vol. 56, No. 2, Feb. 1, 2015, 11 pages.

James Vincent, "This UK Supermarket could Beat Amazon to Self-driving Grocery Deliveries", The Verge, Jun. 28, 2017, 04 pages.

International Search Report and Written Opinion of PCT Application No. PCT/JP2018/019666, issued on Aug. 21, 2018, 07 pages of English Translation and 06 pages of ISRWO.

Notice of Allowance for U.S. Appl. No. 16/639,219, issued on Aug. 8, 2023, 11 pages.

Non-Final Office Action for U.S. Appl. No. 16/639,219, issued on Mar. 1, 2023, 29 pages.

Final Office Action for U.S. Appl. No. 16/639,219, issued on Nov. 4, 2022, 39 pages.

Non-Final Office Action for U.S. Appl. No. 16/639,219, issued on Jun. 7, 2022, 41 pages.

Advisory Action for U.S. Appl. No. 16/639,219, issued on Jan. 10, 2023, 03 pages.

* cited by examiner

CONTROL SYSTEM AND CONTROL METHOD

CROSS REFERENCE TO RELATED APPLICATIONS

The present application is a continuation application of U.S. patent application Ser. No. 16/639,219, filed on Feb. 14, 2020, which is a U.S. National Phase of International Patent Application No. PCT/JP2018/019666 filed on May 22, 2018, which claims priority benefit of Japanese Patent Application No. JP 2017-161256 filed in the Japan Patent Office on Aug. 24, 2017. Each of the above-referenced applications is hereby incorporated herein by reference in its entirety.

TECHNICAL FIELD

The present disclosure relates to a control system and a control method.

BACKGROUND ART

These days, the number of delivery articles is increasing year by year due to the spread of the Internet shopping, etc., but the cost of redelivery when the consignee is absent has been a problem. In a multiple dwelling house equipped with delivery boxes, sending to the delivery boxes is possible; however, in a case where a delivery box is not installed, particularly in a private house or the like, it has been necessary to redeliver again in a case where the consignee is absent upon a redelivery.

Here, for delivery automation technology, for example, Patent Document 1 below discloses a technology in which, in self-guided vehicle home delivery service, the positions of consignees are specified from the positions of mobiles that correspond to information of access to a plurality of delivery boxes provided on a loading platform of a truck, and the destination is updated automatically.

Further, Patent Document 2 below discloses a technology in which, in automatic home delivery service, the destination is updated automatically from the position of a mobile of a consignee.

Further, Patent Document 3 below discloses a technology in which, in a small-sized unmanned aerial vehicle (UAV) that performs automatic home delivery, the destination is updated in accordance with the current position of a user.

CITATION LIST

Patent Document

Patent Document 1: U.S. Pat. No. 9,256,852
Patent Document 2: US Patent Application Laid-Open No. 2014/0330456
Patent Document 3: US Patent Application Laid-Open No. 2015/0120094

SUMMARY OF THE INVENTION

Problems to be Solved by the Invention

However, all the technologies are technology in which delivery is started after the current position of a consignee is set as the destination, and a system using an automatic home delivery locker that goes around in a region has not been studied.

Thus, the present disclosure proposes a control system and a control method that can improve the convenience of delivery service by reducing the number of redeliveries by using an automatic home delivery locker vehicle that goes around in a region.

Solutions to Problems

According to the present disclosure, there is provided a control system configured to manage running of an automatic driving home delivery locker going around in a specified region by automatic driving, the control system including: a communication unit configured to receive a notification showing that the automatic driving home delivery locker has received a home delivery article; and a control unit configured to make control such that an inquiry is made to a terminal device of a consignee of the home delivery article via the communication unit in accordance with reception of the notification so as to estimate a current position of the consignee, and when the consignee is in the specified region, a new running path on which the automatic driving home delivery locker travels a vicinity of the current position of the consignee or a sending destination of the home delivery article is generated and is transmitted to the automatic driving home delivery locker via the communication unit.

According to the present disclosure, there is provided a control method that manages running of an automatic driving home delivery locker going around in a specified region by automatic driving, the control method including: receiving, by a processor via a communication unit, a notification showing that the automatic driving home delivery locker has received a home delivery article, and making control, by the processor, such that an inquiry is made to a terminal device of a consignee of the home delivery article via the communication unit in accordance with reception of the notification so as to estimate a current position of the consignee, and when the consignee is in the specified region, a new running path on which the automatic driving home delivery locker travels a vicinity of the current position of the consignee or a sending destination of the home delivery article is generated and is transmitted to the automatic driving home delivery locker via the communication unit.

Effects of the Invention

As described above, according to the present disclosure, the convenience of delivery service can be improved by reducing the number of redeliveries by using an automatic home delivery locker that goes around in a region.

Note that the effects described above are not necessarily limitative. With or in the place of the above effects, there may be achieved any one of the effects described in this specification or other effects that may be grasped from this specification.

MODE FOR CARRYING OUT THE INVENTION

Figure 1:
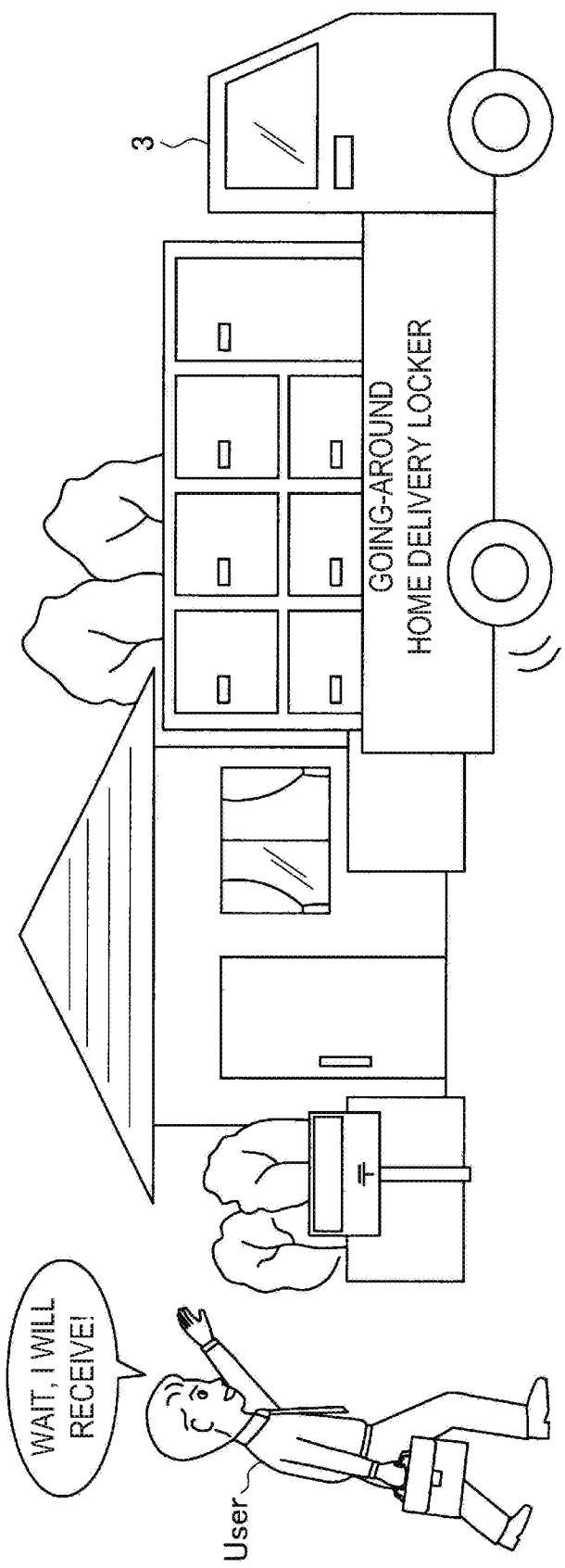
FIG. 1 is a diagram describing an overview of an information processing system according to an embodiment of the present disclosure.

Hereinafter, (a) preferred embodiment(s) of the present disclosure will be described in detail with reference to the appended drawings. Note that, in this specification and the appended drawings, components that have substantially the same functional configuration are denoted with the same reference numerals, and repeated explanation of these structural elements is omitted.

Further, the description is given in the following order.
1. Overview of information processing system according to embodiment of present disclosure
2. Configurations
2-1. Configuration of home delivery agent terminal 1
2-2. Configuration of server 2
2-3. Configuration of home delivery locker vehicle 3
2-4. Configuration of consignee terminal 4
3. Practical examples
3-1. First practical example
(3-1-1. Transfer of home delivery article to home delivery locker vehicle)
(3-1-2. Receipt of home delivery article from home delivery locker vehicle)
3-2. Second practical example
3-3. Third practical example
4. Modification examples
5. Conclusions 1. OVERVIEW OF INFORMATION PROCESSING SYSTEM ACCORDING TO EMBODIMENT OF PRESENT DISCLOSURE FIG. 1 is a diagram describing an overview of an information processing system according to an embodiment of the present disclosure. As shown in FIG. 1, in the information processing system according to the present embodiment, a home delivery locker vehicle 3 that goes around in a region by automatic driving can take a package (a home delivery article) addressed to a user from a home delivery agent or the like, and can deliver the package to the home of the user.

Specifically, if the home delivery locker vehicle 3 takes a package addressed to a user from a home delivery agent, the home delivery locker vehicle 3 goes around in a region on a route that passes through the current place of the user or the vicinity of the home. The user can stop the home delivery locker vehicle 3 traveling the surroundings at an arbitrary timing, for example at a timing when the user has returned to the home or the like, and can receive the package.

Thereby, a home delivery agent has only to load a package into the home delivery locker vehicle 3 that goes around by automatic driving in a region where the consignee (the user) lives, and can load also a package addressed to a user of a private house or the like not having a delivery box; thus, the cost of redelivery is reduced.

Further, the home delivery locker vehicle 3 usually goes around in a region on a steady route set in advance; in a case where a consignee is present in the region, the home delivery locker vehicle 3 may go around on a route passing through the current place of the consignee or the surroundings of the home. The consignee can receive a package at an arbitrary timing from the home delivery locker vehicle 3 going around, and is not restricted by receipt time.

Thus, in the present embodiment, according to the present disclosure, the convenience of delivery service can be improved by reducing the number of redeliveries by using an automatic home delivery locker that goes around in a region.

Figure 2:
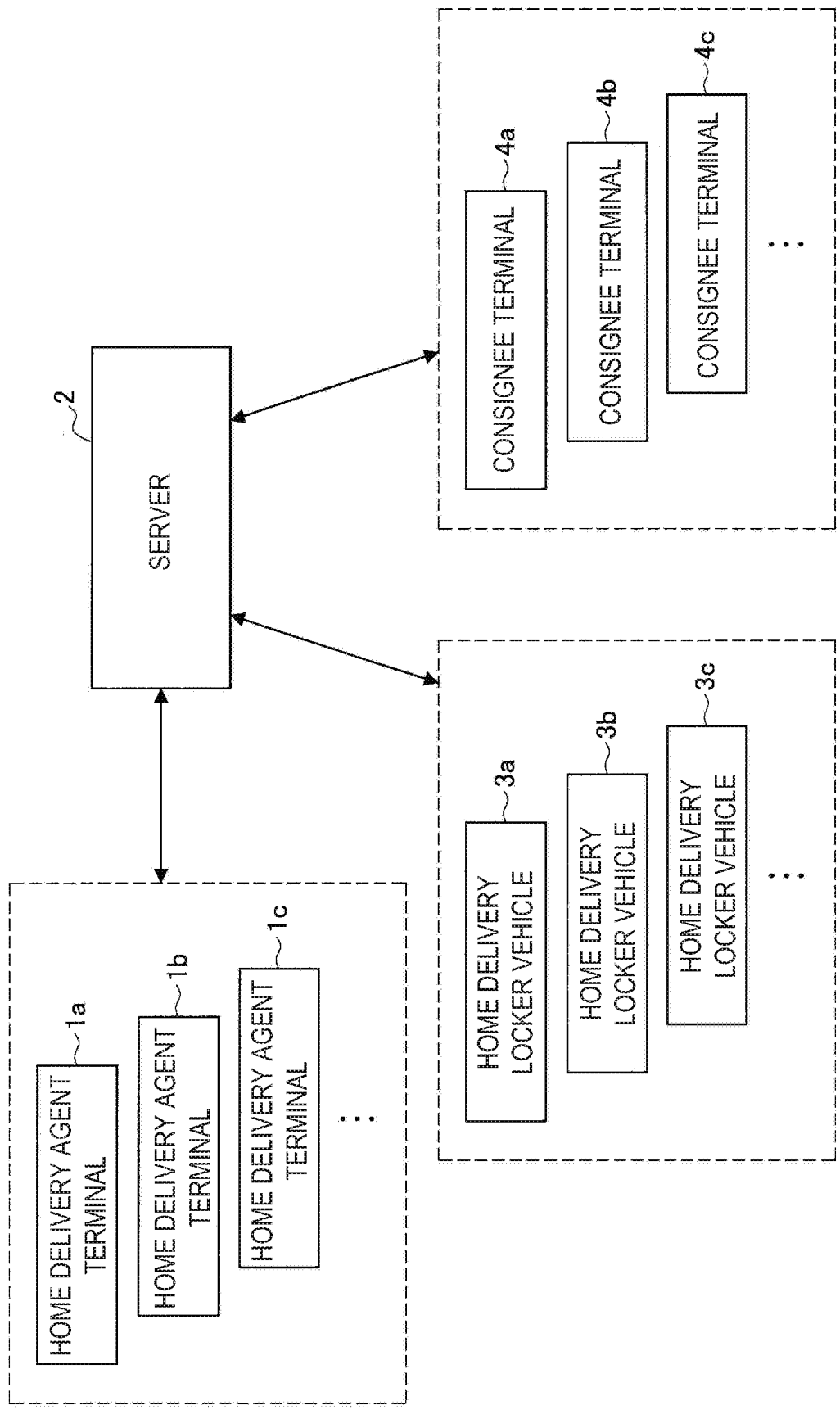
FIG. 2 is a diagram showing an example of an overall configuration of an information processing system according to the present embodiment.

Next, an overall configuration of such an information processing system according to the present embodiment is described with reference to FIG. 2. FIG. 2 is a diagram showing an example of an overall configuration of an information processing system according to the present embodiment.

As shown in FIG. 2, an information processing system according to the present embodiment includes a home delivery agent terminal 1, a server 2, the home delivery locker vehicle 3, and a consignee terminal 4.

The home delivery agent terminal 1, which is a communication terminal carried by a home delivery agent, receives, from the server 2, information regarding the current position of the home delivery locker vehicle 3 or a meeting point for the home delivery locker vehicle 3, and notifies that the home delivery agent has loaded a package into the home delivery locker vehicle 3. For example, the home delivery agent terminal 1 may include a smartphone, a mobile phone terminal, a tablet terminal, a PC, a wearable device (for example, a smartwatch, a smart band, a smart eyeglass, an HMD, a smart neck terminal, a smart ear cuff, or a smart earphone), or the like.

The server 2 can transmit and receive data with each of the home delivery agent terminal 1, the home delivery locker vehicle 3, and the consignee terminal 4. For example, the server 2 settles, from the current position of the home delivery agent terminal 1 and the current position of the home delivery locker vehicle 3, a meeting point where a package is to be received, and settles, from the current position of the home delivery locker vehicle 3 and the current position of the consignee terminal 4, a going-around route of the home delivery locker vehicle 3. Further, the server 2 may transmit, to the consignee terminal 4, the fact that a package addressed to the user is kept in the home delivery locker vehicle 3 and the position of the home delivery locker vehicle 3.

The home delivery locker vehicle 3 is a self-guided vehicle that goes around in a specified region by automatic driving. Further, the home delivery locker vehicle 3 is mounted with a large number of delivery boxes, and allows packages to be received and handed over without using human hands. Further, the home delivery locker vehicle 3 may go around on, for example, a route of approximately 10 Km per round at a speed of approximately 10 Km per hour so as to travel at a slow speed at which it is easy for a consignee or a home delivery agent to automatically stop the home delivery locker vehicle 3 upon happening to see it.

Further, the home delivery locker vehicle 3 according to the present embodiment is not limited to delivery uses, and may be one having also other functions, such as an automatic selling vehicle. For example, like a movable convenience store in an underpopulated area, an automatic selling vehicle carrying a large number of purchasable commodities may be mounted with home delivery lockers, and may be made to go around by automatic driving.

The consignee terminal 4 is a communication terminal carried by a user and receives, from the server 2, a notification regarding delivery of a package. For example, the consignee terminal 4 receives, from the server 2, the current place of the home delivery locker vehicle 3 that keeps a package addressed to the user and information that the home delivery locker vehicle 3 is in the neighborhood, and notifies the user of these pieces of information. For example, the consignee terminal 4 may include a smartphone, a mobile phone terminal, a tablet terminal, a PC, a wearable device (for example, a smartwatch, a smart band, a smart eyeglass, an HMD, a smart neck terminal, a smart ear cuff, or a smart earphone), or the like.

Hereinabove, an information processing system according to an embodiment of the present disclosure is described. Next, specific configurations of devices included in the information processing system according to the present embodiment are described with reference to the drawings.

2. CONFIGURATION 2-1. Configuration of Home Delivery Agent Terminal 1

Figure 3:
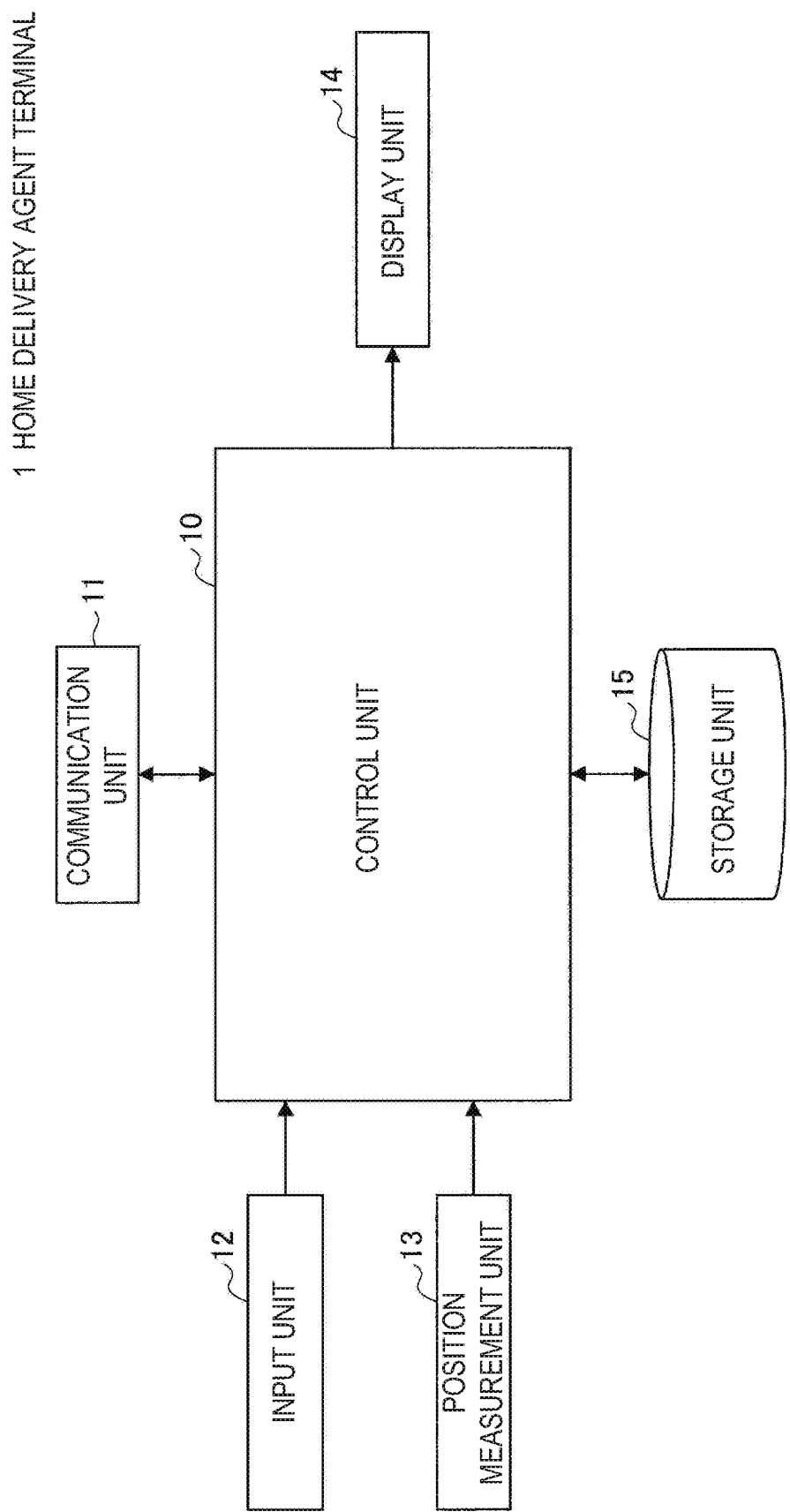
FIG. 3 is a block diagram showing an example of the configuration of a home delivery agent terminal according to the present embodiment.

FIG. 3 is a block diagram showing an example of the configuration of the home delivery agent terminal 1 according to the present embodiment. As shown in FIG. 3, the home delivery agent terminal 1 includes a control unit 10, a communication unit 11, an input unit 12, a position measurement unit 13, a display unit 14, and a storage unit 15.

The control unit 10 functions as an arithmetic processing device and a control device, and controls the entire operation in the home delivery agent terminal 1 in conformity with various programs. The control unit 10 includes, for example, an electronic circuit such as a central processing unit (CPU) or a microprocessor. Further, the control unit 10 may include a read-only memory (ROM) that stores programs, operating parameters, etc., to be used and a random access memory (RAM) that temporarily stores parameters etc., changing as appropriate.

Further, the control unit 10 according to the present embodiment makes control such that the current place measured by the position measurement unit 13 is transmitted to the server 2 via the communication unit 11 and information inputted by the home delivery agent from the input unit 12 is transmitted to the server 2 via the communication unit 11. Further, the control unit 10 makes control such that information regarding the current position of the home delivery locker vehicle 3 and a meeting point (a meeting place) for the home delivery locker vehicle 3 received from the server 2 via the communication unit 11 is presented from the display unit 14 together with, for example, a map image.

(Communication Unit 11)

The communication unit 11, for example, transmits and receives data to/from the server 2 via a network. The communication unit 11 can communicate and connect with the server 2 by means of, for example, a wired/wireless local area network (LAN), Wi-Fi (registered trademark), a mobile communication network (Long-Term Evolution (LTE), Bluetooth (registered trademark), or a third-generation mobile communication system (3G)), or the like.

(Input Unit 12)

The input unit 12 accepts an action instruction by the user (herein, the home delivery agent), and functions as an action input unit that outputs an action content to the control unit 10. The input unit 12 may be a touch sensor, a pressure sensor, or a proximity sensor. Alternatively, the input unit 12 may be a physical configuration such as buttons, switches, or levers. Note that the input unit 12 may include a voice input unit to allow voice input by the user.

(Position Measurement Unit 13)

The position measurement unit 13 has the function of sensing the current position of the home delivery agent terminal 1 on the basis of a signal acquired from the outside. Specifically, for example, the position measurement unit 13 includes a Global Positioning System (GPS) position measurement unit; and receives a radio wave from a GPS satellite to sense the position where the home delivery agent terminal 1 exists, and outputs the sensed position information to the control unit 10. Further, the position measurement unit 13 may be a device that senses the position, for example, other than using the GPS, via Wi-Fi (registered trademark) or Bluetooth (registered trademark), transmission and reception to/from a mobile phone, the PHS, a smartphone, or the like, or by short-range communication or the like.

(Display Unit 14)

The display unit 14 is a display device that outputs various display screens such as an action input screen and a menu screen. The display unit 14 may be, for example, a display device such as a liquid crystal display (LCD) or an organic electro-luminescence (EL) display. The display unit 14 displays, on a map image, an image showing the current place of the home delivery locker vehicle 3 or a meeting point for the home delivery locker vehicle, for example. Note that, although the present embodiment includes the display unit 14 as an example of an output unit, the present embodiment is not limited to such configuration. Various notifications may be outputted to the home delivery agent by a voice output unit (not illustrated) included in the home delivery agent terminal 1, by itself or together with the display unit.

(Storage Unit 15)

The storage unit 15 includes a read-only memory (ROM) that stores programs, operating parameters, etc., used for the processing of the control unit 10 and a random access memory (RAM) that temporarily stores parameters etc., changing as appropriate.

2-2. Configuration of Server 2

Figure 4:
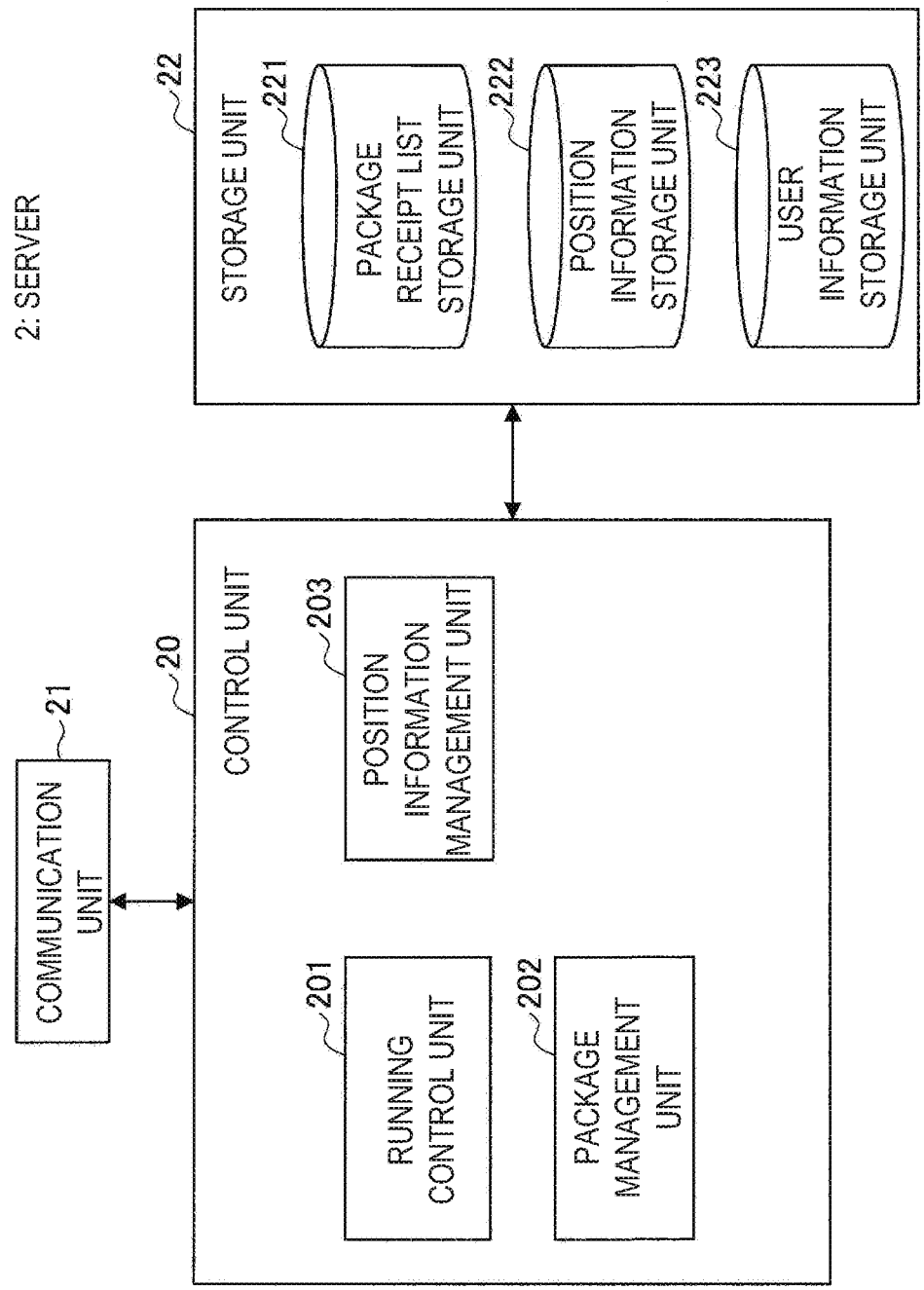
FIG. 4 is a block diagram showing an example of the configuration of a server according to the present embodiment.

FIG. 4 is a block diagram showing an example of the configuration of the server 2 according to the present embodiment. As shown in FIG. 4, the server 2 includes a control unit 20, a communication unit 21, and a storage unit 22.

(Control Unit 20)

The control unit 20 functions as an arithmetic processing device and a control device, and controls the entire operation in the server 2 in conformity with various programs. The control unit 20 includes, for example, an electronic circuit such as a central processing unit (CPU) or a microprocessor. Further, the control unit 20 may include a read-only memory (ROM) that stores programs, operating parameters, etc., to be used and a random access memory (RAM) that temporarily stores parameters etc., changing as appropriate.

Further, the control unit 20 according to the present embodiment functions also as a running control unit 201, a package management unit 202, and a position information management unit 203.

The running control unit 201 makes control regarding the automatic driving of the home delivery locker vehicle 3, such as the settlement of a route of the home delivery locker vehicle 3 that goes around in a prescribed area by automatic driving. For example, the running control unit 201 assesses whether the current place of the consignee of a package (a home delivery article) loaded in the home delivery locker vehicle 3 is in a specified region (that is, in the going-around area of the home delivery locker vehicle 3) or not. In a case where the current place of the consignee is in the specified region, the running control unit 201 makes control such that a going-around route on which the home delivery locker vehicle 3 travels the current place of the consignee or the vicinity of a prescribed sending destination (the home of the consignee, or a ski site etc., in the area) is generated and is transmitted to the home delivery locker vehicle 3.

The package management unit 202 manages information regarding a package loaded in the home delivery locker vehicle 3, by using a package receipt list stored in a package receipt list storage unit 221. The information of a package loaded in the home delivery locker vehicle 3 can be received from the home delivery agent terminal 1.

The position information management unit 203 collects the current position of the home delivery locker vehicle 3, the current position of the home delivery agent terminal 1, the current position of the consignee terminal 4, etc., and manages them by using a position information storage unit 222.

(Communication Unit 21)

The communication unit 21 connects with a network via wire or wirelessly, and transmits and receives data with external devices, specifically the home delivery agent terminal 1, the home delivery locker vehicle 3, the consignee terminal 4, etc., via the network. The communication unit 21 communicates and connects with a network by means of, for example, a wired/wireless local area network (LAN), Wireless Fidelity (Wi-Fi, registered trademark), or the like.

(Storage Unit 22)

The storage unit 22 includes a ROM that stores programs, operating parameters, etc., used for the processing of the control unit 20 and a RAM that temporarily stores parameters etc., changing as appropriate. For example, as shown in FIG. 4, the storage unit 22 according to the present embodiment houses the package receipt list storage unit 221, the position information storage unit 222, and a user information storage unit 223.

The package receipt list storage unit 221 stores information regarding packages (home delivery articles) loaded in each home delivery locker vehicle 3 (consignee information, sending destination addresses, home delivery agent information, the time instants of loading, whether packages have been received by consignees or not, etc.). Such information can be transmitted to the server 2 by, for example, a home delivery agent's inputting on the home delivery agent terminal 1 when loading a package into the home delivery locker vehicle 3.

The position information storage unit 222 stores the current position of each home delivery locker vehicle 3, the current position of the home delivery agent terminal 1, the current position of the consignee terminal 4, etc. These pieces of position information are transmitted from the home delivery locker vehicle 3, the home delivery agent terminal 1, and the consignee terminal 4, respectively.

The user information storage unit 223 stores information regarding a user. For example, the user information storage unit 223 stores information of a use-registered user who demands home delivery using the home delivery locker vehicle 3 according to the present embodiment (for example, the full name and the home address), etc.

Hereinabove, the configuration of the server 2 according to the present embodiment is specifically described. Note that the configuration of the server 2 shown in FIG. 4 is an example, and the present embodiment is not limited to this. For example, the configuration of at least part of the server 2 may be provided in an external device, and at least part of each function of the control unit 20 may be provided by an information processing terminal (for example, what is called an edge server or the like) of which the communication distance is relatively near to the home delivery agent terminal 1, the home delivery locker vehicle 3, or the consignee terminal 4. Thus, by distributing configurations of the server 2 as appropriate, it becomes possible to improve real time characteristics and reduce the burden of processing, and further ensure security. Further, servers 2 may individually manage one or a plurality of specified regions (areas where home delivery locker vehicles 3 go around).

2-3. Configuration of Home Delivery Locker Vehicle 3

Figure 5:
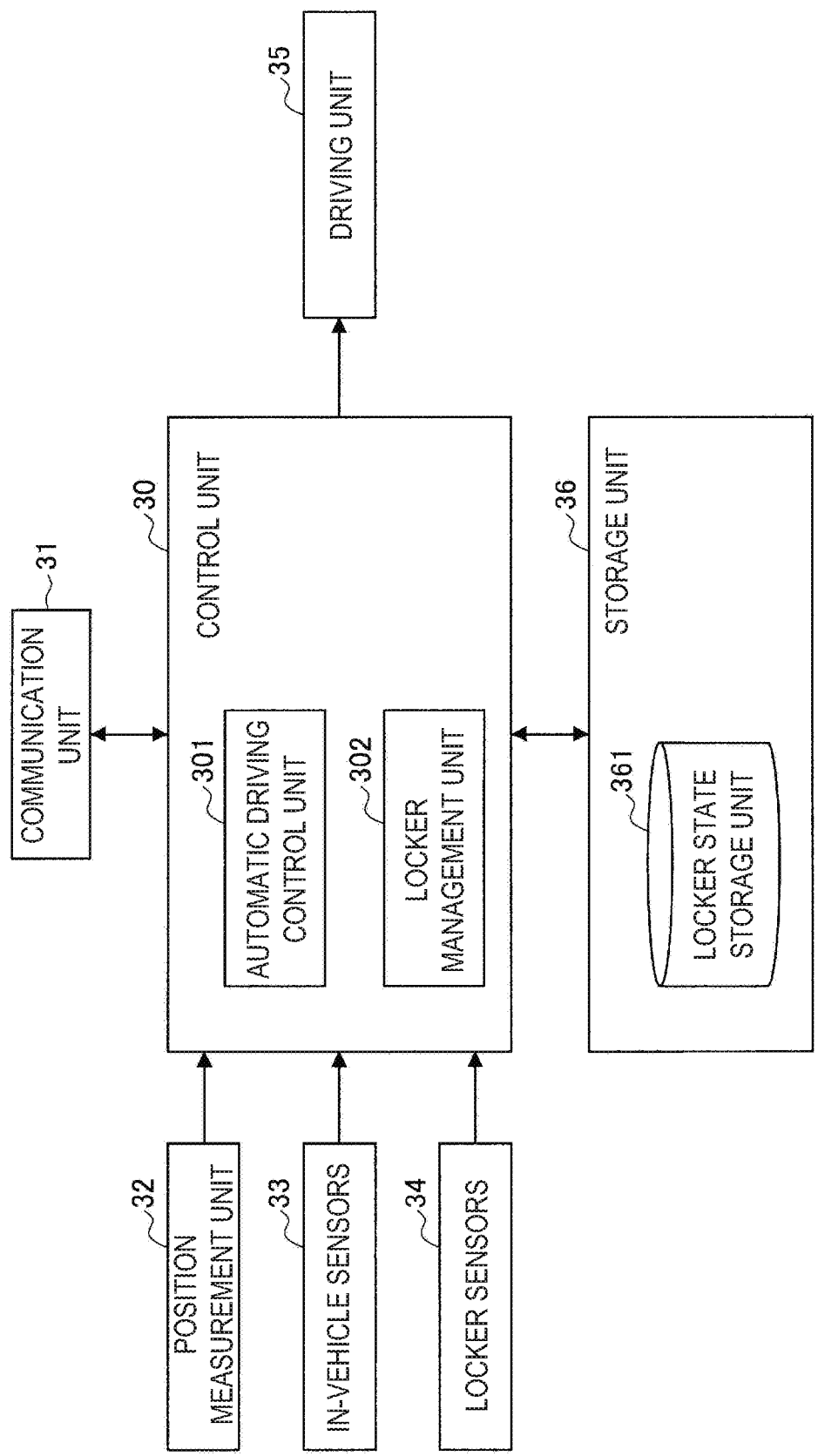
FIG. 5 is a block diagram showing an example of the configuration of a home delivery locker vehicle according to the present embodiment.

FIG. 5 is a block diagram showing an example of the configuration of the home delivery locker vehicle 3 according to the present embodiment. As shown in FIG. 5, the home delivery locker vehicle 3 includes a control unit 30, a communication unit 31, a position measurement unit 32, in-vehicle sensors 33, locker sensors 34, a driving unit 35, and a storage unit 36.

The control unit 30 functions as an arithmetic processing device and a control device, and controls the entire operation in the home delivery locker vehicle 3 in conformity with various programs. The control unit 30 includes, for example, an electronic circuit such as a central processing unit (CPU) or a microprocessor. Further, the control unit 30 may include a read-only memory (ROM) that stores programs, operating parameters, etc., to be used and a random access memory (RAM) that temporarily stores parameters etc., changing as appropriate.

The control unit 30 according to the present embodiment makes control such that the current place measured by the position measurement unit 32 is transmitted to the server 2 via the communication unit 31, and makes control such that automatic travel is performed in conformity with a going-around route received from the server 2. Specifically, as shown in FIG. 5, the control unit 30 can function as an automatic driving control unit 301 and a locker management unit 302.

The automatic driving control unit 301 performs automatic travel control of the home delivery locker vehicle 3 in conformity with a prescribed route. The automatic driving control unit 301 may control travel on a road for self-guided vehicles, or may control travel on an ordinary road. For example, the automatic driving control unit 301 controls driving of an accelerator, a brake, and a steering wheel by means of the driving unit 35 on the basis of the surrounding situation sensed by the in-vehicle sensors 33 so that the vehicle goes around in a prescribed route in conformity with running control by the server 2.

The locker management unit 302 manages the state of a large number of home delivery lockers mounted on the home delivery locker vehicle 3. Specifically, for example, the locker management unit 302 stores, in a locker state storage unit 361, the presence or absence of a package in each locker, the sending destination of a package in each locker, the consignee, the loader (the home delivery agent or the like), the time instant of loading, the presence of absence of receipt, etc., and manages them. The structure of a large number of home delivery lockers mounted on the home delivery locker vehicle 3 is not particularly limited and is; for example, an opening and closing type, in which a locker is locked when a package is in the locker and can be unlocked by receiving a prescribed personal identification number or a specified ID, or the like.

(Communication Unit 31)

The communication unit 31, for example, transmits and receives data to/from the server 2 via a network. The communication unit 31 can communicate and connect with the server 2 by means of, for example, a wired/wireless local area network (LAN), Wi-Fi (registered trademark), a mobile communication network (Long-Term Evolution (LTE), Bluetooth (registered trademark), or a third-generation mobile communication system (3G)), or the like.

(Position Measurement Unit 32)

The position measurement unit 32 has the function of sensing the current position of the home delivery locker vehicle 3 on the basis of a signal acquired from the outside. Specifically, for example, the position measurement unit 32 includes a Global Positioning System (GPS) position measurement unit; and receives a radio wave from a GPS satellite to sense the position where the home delivery locker vehicle 3 exists, and outputs the sensed position information to the control unit 30. Further, the position measurement unit 32 may be a device that senses the position, for example, other than using the GPS, via Wi-Fi (registered trademark) or Bluetooth (registered trademark), transmission and reception to/from a mobile phone, the PHS, a smartphone, or the like, or short-range communication or the like.

(In-Vehicle Sensors 33)

The in-vehicle sensors 33 are various sensor devices that sense the state of the home delivery locker vehicle 3 and the situation of the surroundings of the home delivery locker vehicle 3, and are used for automatic travel control by the automatic driving control unit 301. Examples of the in-vehicle sensor 33 include a camera device, a radar, an ultrasonic sensor, a speed sensor, an acceleration sensor, a gyro sensor, and the like. Further, the in-vehicle sensors 33 may include a sensing unit that senses markers provided on a road for self-guided vehicles.

(Locker Sensors 34)

The locker sensors 34 are various sensor devices that sense the state of each locker mounted on the home delivery locker vehicle 3. For example, the locker sensors 34 can sense the lock state, opening and closing sensing, the status of use (the presence or absence of a package), etc., of each locker.

(Driving Unit 35)

The driving unit 35 includes various driving units regarding the travel of the home delivery locker vehicle 3, such as a steering wheel driving unit, an accelerator driving unit, and a brake driving unit.

(Storage Unit 36)

The storage unit 36 includes a read-only memory (ROM) that stores programs, operating parameters, etc., used for the processing of the control unit 30 and a random access memory (RAM) that temporarily stores parameters etc., changing as appropriate.

Further, the storage unit 36 includes the locker state storage unit 361 as shown in FIG. 5. In the locker state storage unit 361, information of the locker state sensed by the locker sensors 34, information of a loaded package received from the home delivery agent terminal 1 via the communication unit 31, etc., are stored by the locker management unit 302.

Hereinabove, the configuration of the home delivery locker vehicle 3 is specifically described; however, the configuration of the home delivery locker vehicle 3 according to the present embodiment is not limited to the example shown in FIG. 5. For example, the home delivery locker vehicle 3 may include an action input unit or a voice input unit as an input unit, and further a display unit or a voice output unit as an output unit.

2-4. Configuration of Consignee Terminal 4

Figure 6:
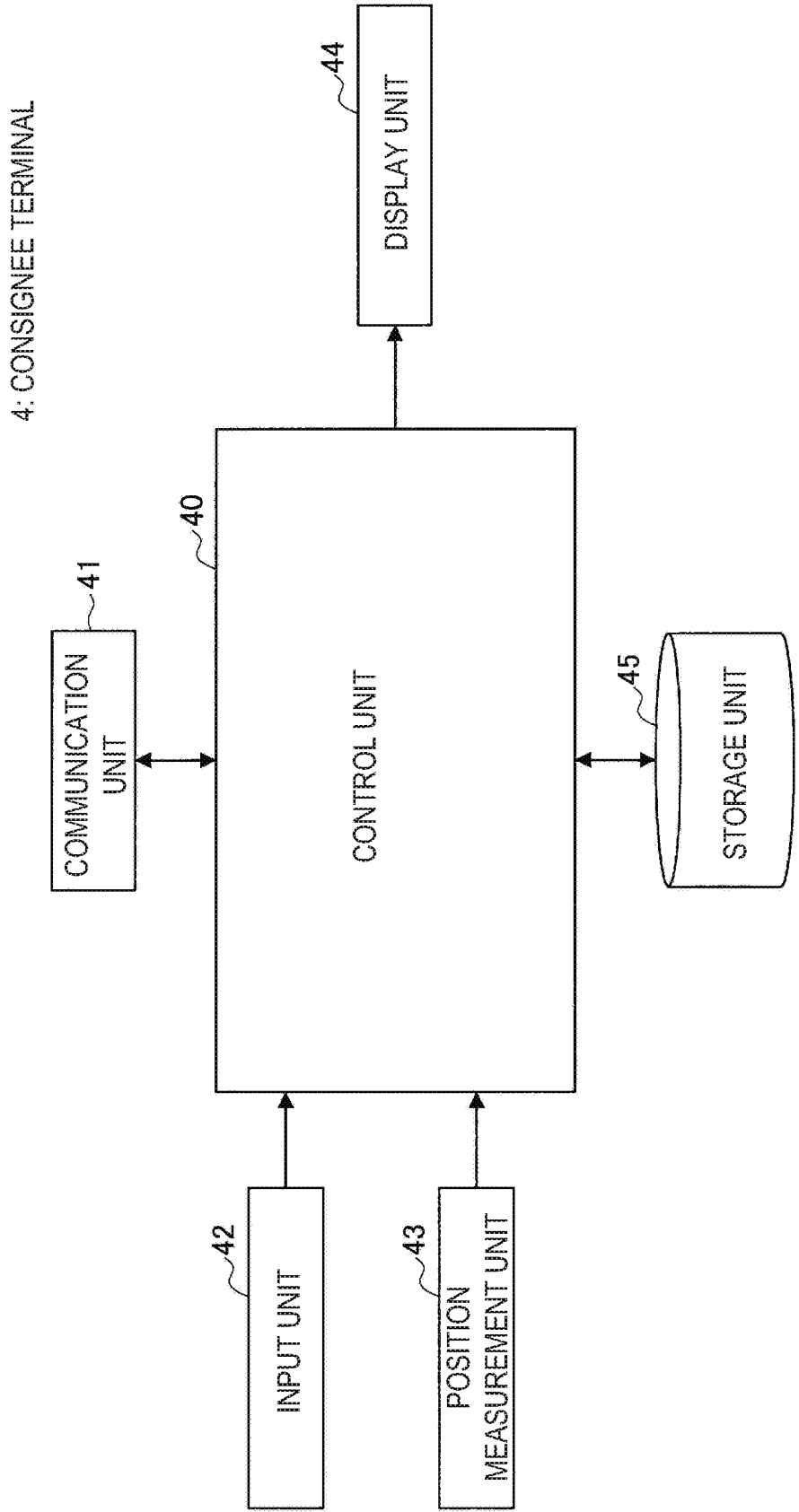
FIG. 6 is a block diagram showing an example of the configuration of a consignee terminal according to the present embodiment.

FIG. 6 is a block diagram showing an example of the configuration of the consignee terminal 4 according to the present embodiment. As shown in FIG. 6, the consignee terminal 4 includes a control unit 40, a communication unit 41, an input unit 42, a position measurement unit 43, a display unit 44, and a storage unit 45.

The control unit 40 functions as an arithmetic processing device and a control device, and controls the entire operation in the consignee terminal 4 in conformity with various programs. The control unit 40 includes, for example, an electronic circuit such as a central processing unit (CPU) or a microprocessor. Further, the control unit 40 may include a read-only memory (ROM) that stores programs, operating parameters, etc., to be used and a random access memory (RAM) that temporarily stores parameters etc., changing as appropriate.

Further, the control unit 40 according to the present embodiment makes control such that the current place measured by the position measurement unit 43 is transmitted to the server 2 via the communication unit 41 or information inputted by the consignee (the user) from the input unit 42 is transmitted to the server 2 via the communication unit 41. Further, the control unit 40 makes control such that the user is notified of the current position of the home delivery locker vehicle 3, the time instant of arrival of the home delivery locker vehicle 3, etc., received from the server 2 via the communication unit 41, from the display unit 44.

(Communication Unit 41)

The communication unit 41, for example, transmits and receives data to/from the server 2 via a network. The communication unit 41 can communicate and connect with the server 2 by means of, for example, a wired/wireless local area network (LAN), Wi-Fi (registered trademark), a mobile communication network (Long-Term Evolution (LTE), Bluetooth (registered trademark), or a third-generation mobile communication system (3G)), or the like.

(Input Unit 42)

The input unit 42 accepts an action instruction by the user (herein, the consignee), and functions as an action input unit that outputs an action content to the control unit 40. The input unit 42 may be a touch sensor, a pressure sensor, or a proximity sensor. Alternatively, the input unit 42 may be a physical configuration such as buttons, switches, or levers. Note that the input unit 42 may include a voice input unit to allow voice input by the user.

(Position Measurement Unit 43)

The position measurement unit 43 has the function of sensing the current position of the consignee terminal 4 on the basis of a signal acquired from the outside. Specifically, for example, the position measurement unit 43 includes a Global Positioning System (GPS) position measurement unit; and receives a radio wave from a GPS satellite to sense the position where the consignee terminal 4 exists, and outputs the sensed position information to the control unit 40. Further, the position measurement unit 43 may be a device that senses the position, for example, other than using the GPS, via Wi-Fi (registered trademark) or Bluetooth (registered trademark), transmission and reception to/from a mobile phone, the PHS, a smartphone, or the like, or by short-range communication or the like.

(Display Unit 44)

The display unit 44 is a display device that outputs various display screens such as an action input screen and a menu screen. The display unit 44 may be, for example, a display device such as a liquid crystal display (LCD) or an organic electro-luminescence (EL) display. The display unit 44 displays, on a map image, an image showing the current place of the home delivery locker vehicle 3, for example. Note that, although the present embodiment includes the display unit 44 as an example of an output unit, the present embodiment is not limited to such configuration. Various notifications may be outputted to the consignee by a voice output unit (not illustrated) included in the consignee terminal 4, by itself or together with the display unit 44.

(Storage Unit 45)

The storage unit 45 includes a read-only memory (ROM) that stores programs, operating parameters, etc., used for the processing of the control unit 40 and a random access memory (RAM) that temporarily stores parameters etc., changing as appropriate.

3. PRACTICAL EXAMPLE

Next, practical examples of the information processing system according to the present embodiment are specifically described using the drawings.

3-1. First Practical Example

First, a first practical example is described with reference to FIG. 7 to FIG. 14. In the first practical example, if a home delivery article is loaded by a home delivery agent into the home delivery locker vehicle 3 that automatically goes around in a region where the consignee lives, the server 2 alters the going-around route of the home delivery locker vehicle 3 in accordance with the current position of the consignee.

Figure 7:
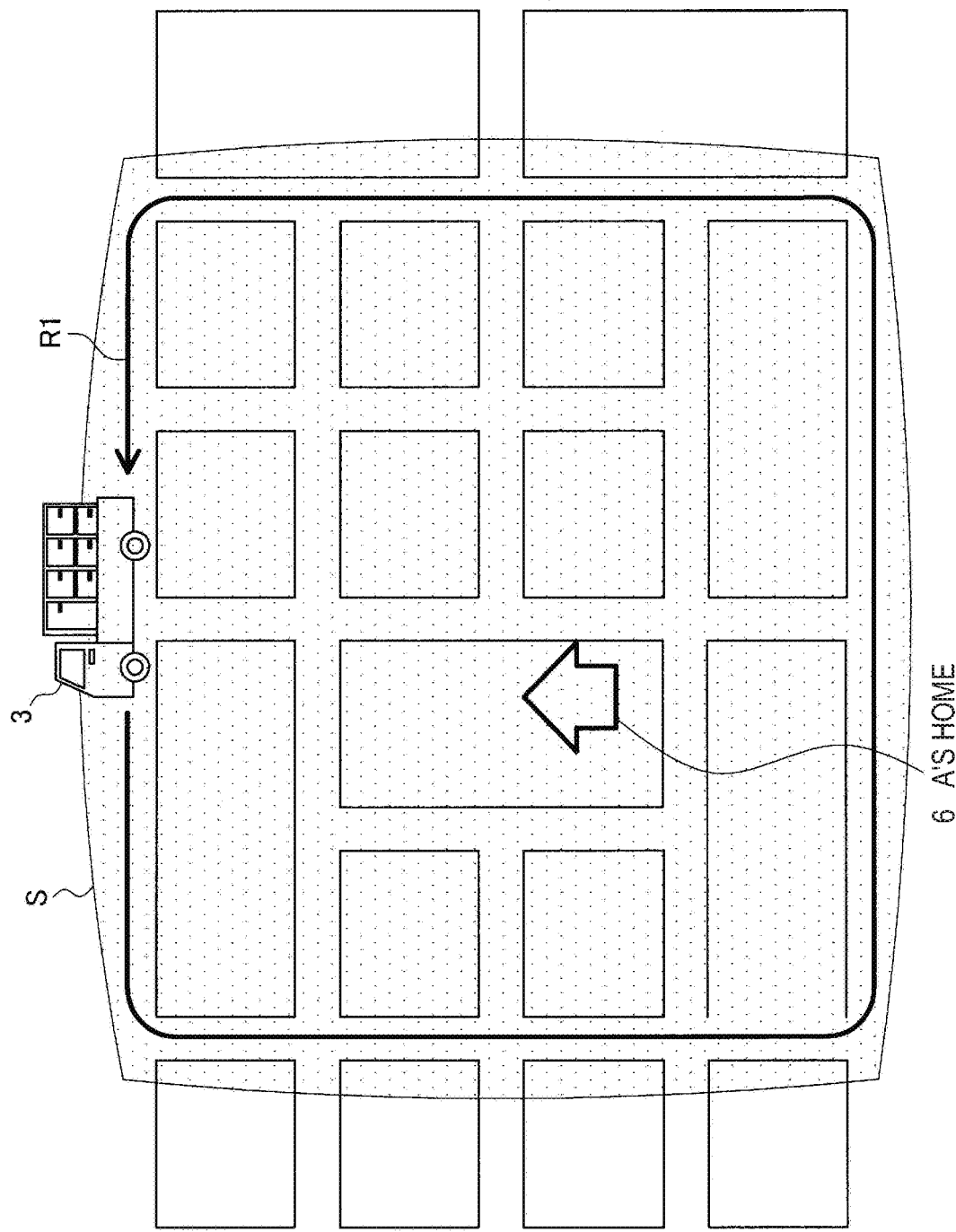
FIG. 7 is a diagram describing automatic going-around of a home delivery locker vehicle according to a first practical example.

FIG. 7 is a diagram describing automatic going-around of a home delivery locker vehicle according to the present practical example. As shown in FIG. 7, in the present practical example, it is assumed that the home delivery locker vehicle 3 exclusively for a specified region S is going around in the region by automatic driving. The going-around route is ordinarily set to a prescribed steady route R1. The steady route R1 is set to, for example, a road that allows easy arrival at anywhere in the region as much as possible by some degree of alteration.

(3-1-1. Transfer of Home Delivery Article to Home Delivery Locker Vehicle)

Next, processing when transferring a home delivery article from a home delivery agent to the home delivery locker vehicle is described with reference to FIG. 8 to FIG. 10. A home delivery agent can use a truck or the like to go to a specified region where user A who is the consignee of a home delivery article lives, and can load the home delivery article into the home delivery locker vehicle 3 that automatically goes around in the specified region.

Figure 8:
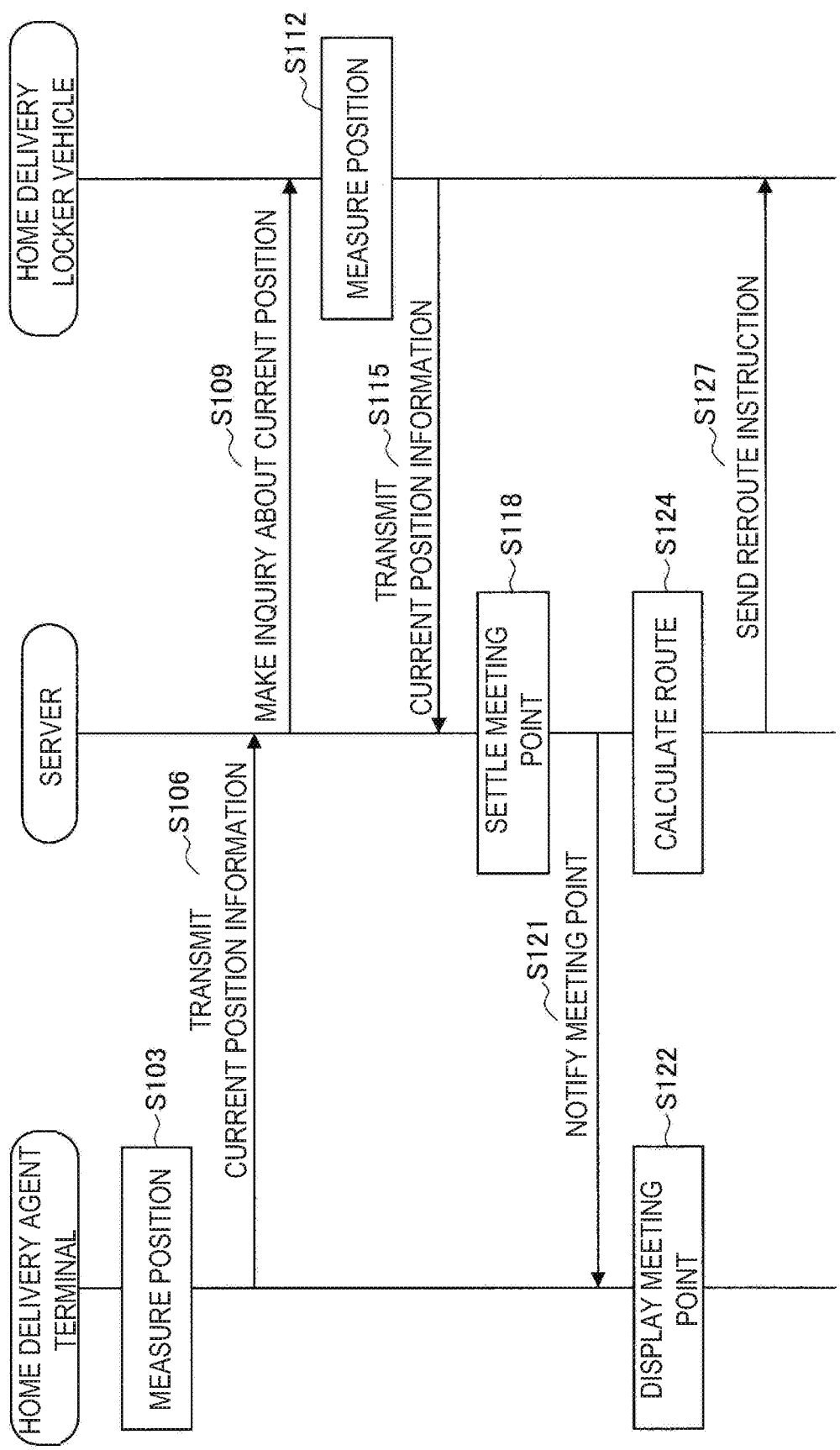
FIG. 8 is a sequence diagram showing route alteration processing of the home delivery locker vehicle when a home delivery agent has come close to a specified region, according to the first practical example.

FIG. 8 is a sequence diagram showing route alteration processing of the home delivery locker vehicle when the home delivery agent has come close to the specified region.

As shown in FIG. 8, first, the home delivery agent terminal 1 carried by the home delivery agent measures the current position by means of the position measurement unit 13 (step S103), and transmits the measured current position information to the server 2 (step S106). The position information may be transmitted in conformity with an instruction by the home delivery agent, or may transmitted automatically by the home delivery agent terminal 1 determining that the home delivery agent has come close to the region of the next home delivery.

Next, the server 2 makes an inquiry about the current position to the home delivery locker vehicle 3 in the prescribed specified region S that is a home delivery place (step S109), and receives, from the home delivery locker vehicle 3, current position information measured by the home delivery locker vehicle 3 (steps S112 and S115).

Next, on the basis of the position of the home delivery agent and the position of the home delivery locker vehicle 3, the server 2 settles a meeting point P for both in the specified region S (step S118). The meeting point P is a place where the home delivery locker vehicle 3 and the truck of the home delivery agent can safely stop, and may, for example, be selected from candidates for safe meeting points that are set in advance on the basis of the current position and the speed of the home delivery agent, and the current position and the speed of the home delivery locker vehicle 3.

Next, the server 2 transmits information of the settled meeting point P to the home delivery agent terminal 1 (step S121). The received information of the meeting point P (for example, a map image showing the meeting point P) is displayed on the home delivery agent terminal 1 (step S122). Alternatively, the home delivery agent terminal 1 may start navigation to the meeting point P.

Next, on the basis of the current position of the home delivery locker vehicle 3, the server 2 calculates a route leading to the meeting point P (step S124).

Next, on the basis of the calculated route, the server 2 sends a reroute instruction to the home delivery locker vehicle 3 (step S127). Thereby, the home delivery locker vehicle 3 performs automatic travel control so as to go to the meeting point P in conformity with the altered route. Note that, depending on the position of the meeting point P and the position of the home delivery locker vehicle 3, there may be a case where the route to the meeting point P is the same as the steady route.

Figure 9:
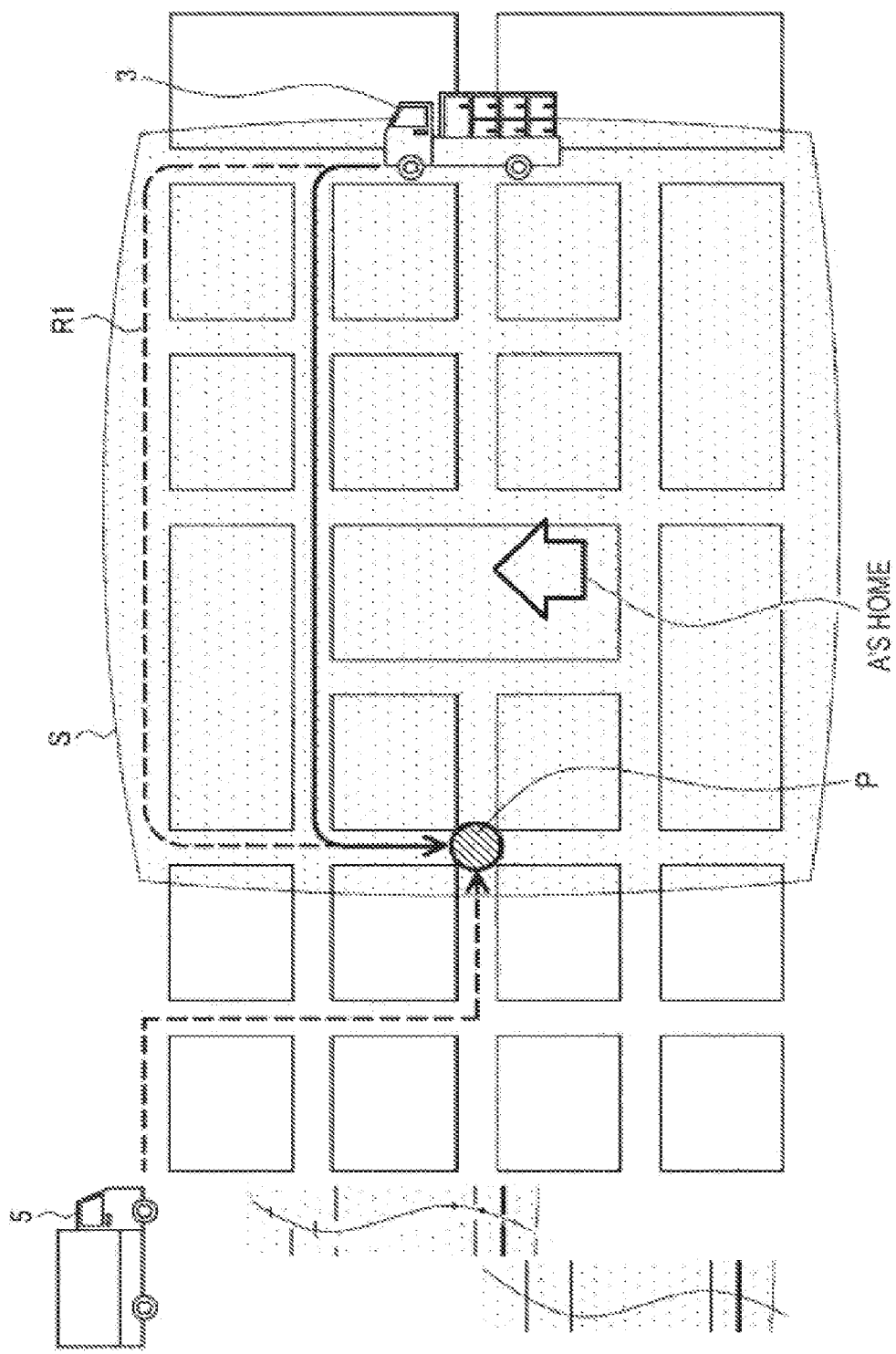
FIG. 9 is a diagram showing an example of a meeting point for the home delivery locker vehicle and a home delivery agent vehicle, according to the first practical example.
Figure 10:
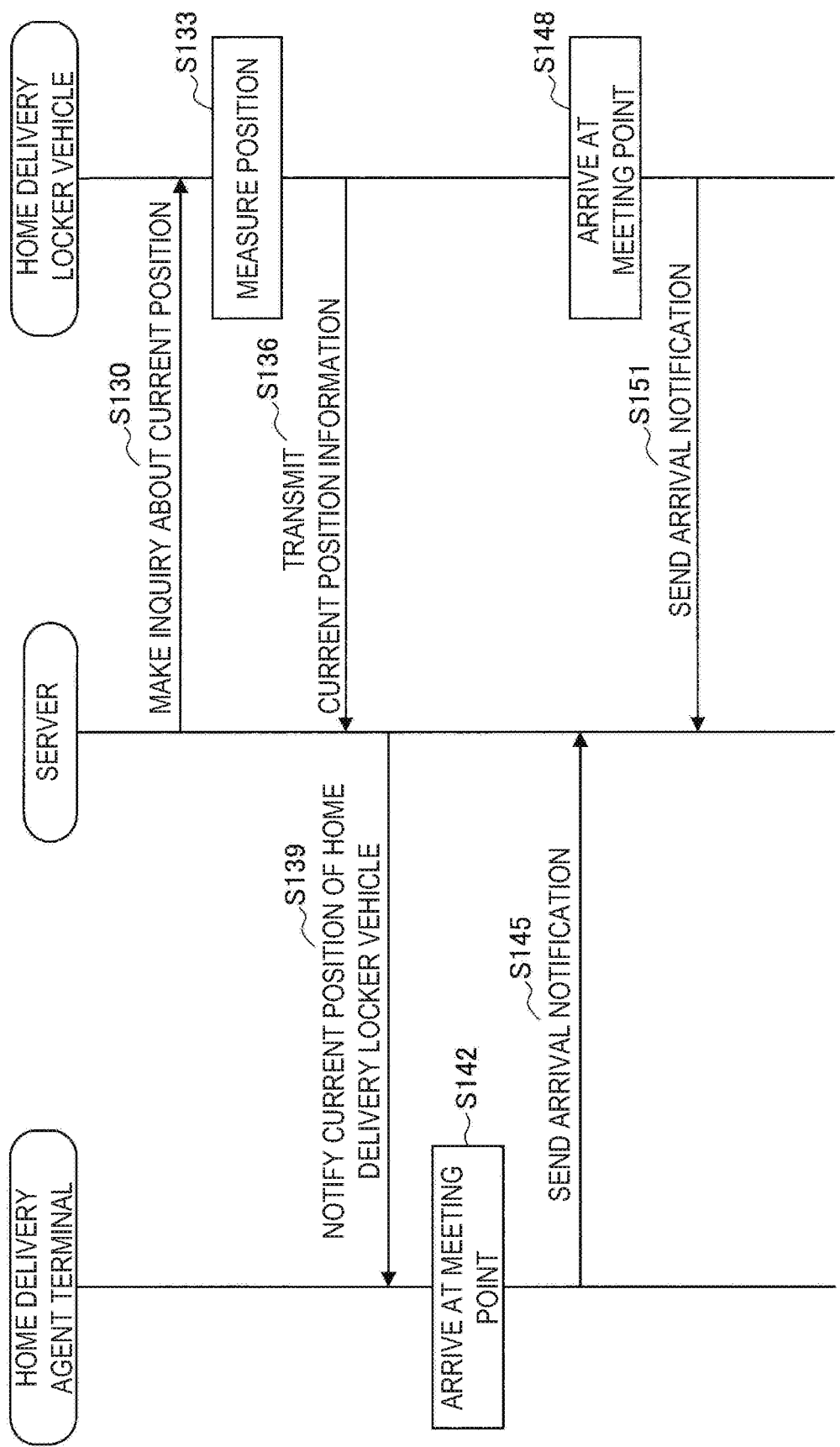
FIG. 10 is a sequence diagram showing operation processing at the time of arrival at the meeting point, according to the first practical example.

Here, FIG. 9 shows an example of the meeting point for the home delivery locker vehicle 3 and a home delivery agent vehicle 5 according to the present practical example. As shown in FIG. 9, if the meeting point P is settled in the specified region S, the home delivery locker vehicle 3 and the home delivery agent vehicle 5 go toward the meeting point P.

Further, the meeting point P may be selected by the home delivery agent. For example, the server 2 may transmit, to the home delivery agent terminal 1, information of a plurality of candidates for meeting points in the specified region S so that the home delivery agent can select the point shortest from the current position of the home delivery agent.

Next, operation processing at the time of arrival at the meeting point is described with reference to FIG. 10. As shown in FIG. 10, if the server 2 acquires the current position of the home delivery locker vehicle 3 (steps S130 to S136), the server 2 notifies the home delivery agent terminal 1 of the current position of the home delivery locker vehicle 3 (step S139). The current position of the home delivery locker vehicle 3 may be notified continuously.

Next, if the home delivery agent terminal 1 arrives at the meeting point (step S142), the home delivery agent terminal 1 transmits an arrival notification to the server 2 (step S145). On the other hand, if the home delivery locker vehicle 3 arrives at the meeting point (step S148), the home delivery locker vehicle 3 also transmits an arrival notification to the server 2 (step S151).

The home delivery locker vehicle 3 and the home delivery agent vehicle 5 stop no matter which vehicle arrives at the meeting point earlier, and the home delivery article is delivered at the meeting point. Specifically, for example, a prescribed action, such as an action in which the home delivery agent loads the home delivery article into an empty locker among the home delivery lockers mounted on the home delivery locker vehicle 3 and locks the locker, is taken. (3-1-2. Receipt of Home Delivery Article from Home Delivery Locker Vehicle)

Next, the receipt of the home delivery article by the consignee from the home delivery locker vehicle 3 is described with reference to FIG. 11 to FIG. 14.

Figure 11:
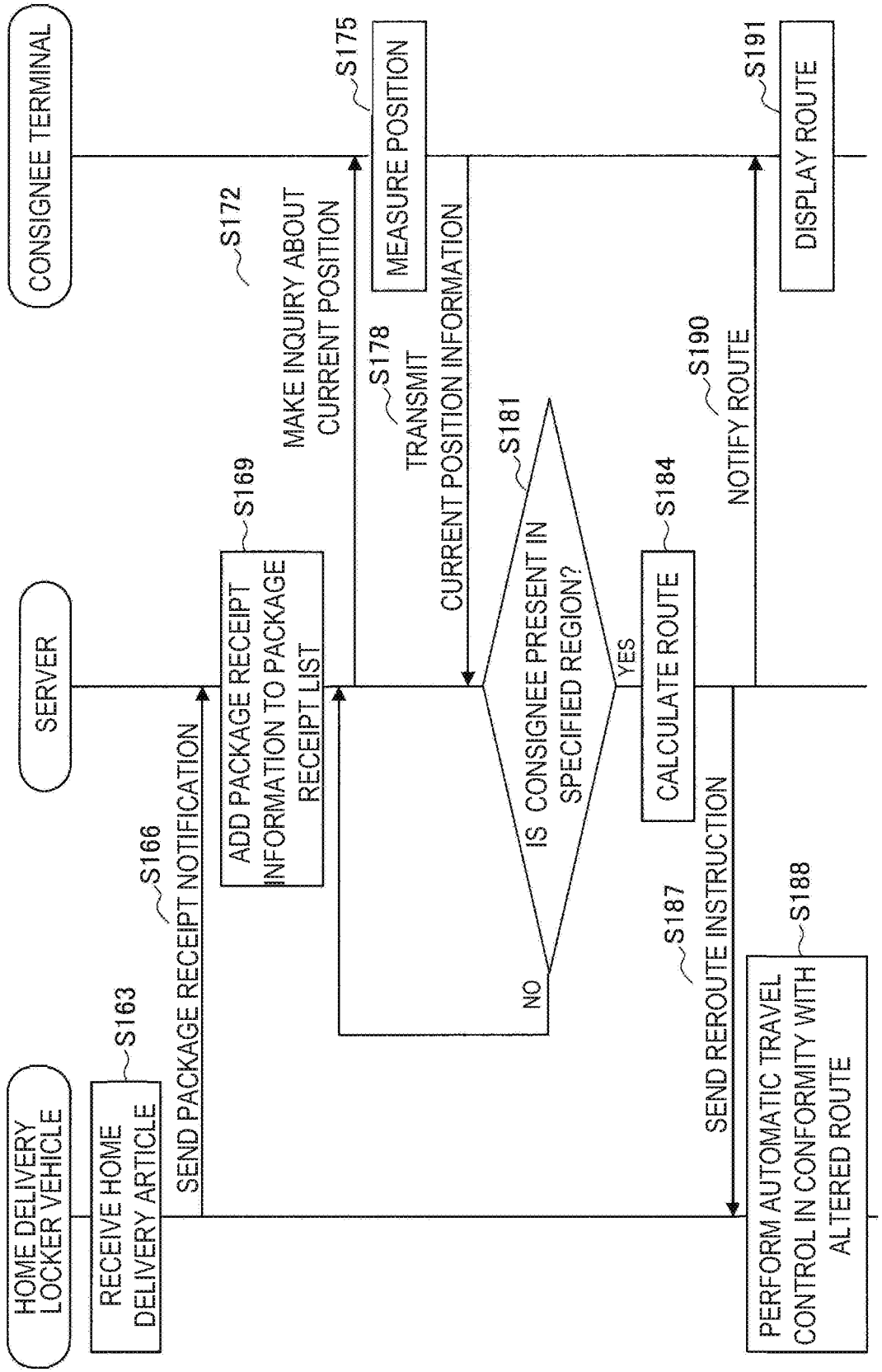
FIG. 11 is a sequence diagram showing route calculation processing of the home delivery locker vehicle according to the current position of a consignee, according to the first practical example.

FIG. 11 is a sequence diagram showing route calculation processing of the home delivery locker vehicle according to the current position of the consignee. As shown in FIG. 11, if the home delivery locker vehicle 3 receives the home delivery article (that is, if the home delivery article is loaded into a locker) (step S163), the home delivery locker vehicle 3 sends a package receipt notification (for example, a package addressed to whom is loaded into a locker of what number, or the like) to the server 2 (step S166).

Next, on the basis of the package receipt notification from the home delivery locker vehicle 3, the server 2 adds information regarding the home delivery article loaded in the home delivery locker vehicle 3 to the package receipt list (step S169). Note that the package receipt notification may include, for example, detailed information regarding the home delivery article (for example, the classification, item, consignee information, sender information, home delivery agent information, order number, etc., of the home delivery article) that was inputted by an action of the home delivery agent when loading the home delivery article (or inputted via the home delivery agent terminal 1).

Next, the server 2 acquires the current position of the consignee terminal 4 in order to estimate the position of the consignee of the home delivery article loaded in the home delivery locker vehicle 3 (steps S172 to S178). The linkage between the consignee and the consignee terminal 4 may be acquired from user information registered in the server 2 in advance. Further, terminal information of users living in the specified region may be registered in advance in the server 2. The consignee terminal 4 is envisaged to be a smartphone, a mobile phone terminal, a tablet terminal, various wearable devices, or the like carried by the consignee (the user); in the present practical example, the current position of the consignee terminal 4 may be regarded as the current position of the consignee.

Next, in a case where the consignee is present in the specified region (step S181/Yes), the server 2 calculates a route passing through the vicinity of the current position of the consignee (step S184), and transmits a reroute instruction to the home delivery locker vehicle 3 (step S187).

Figure 12:
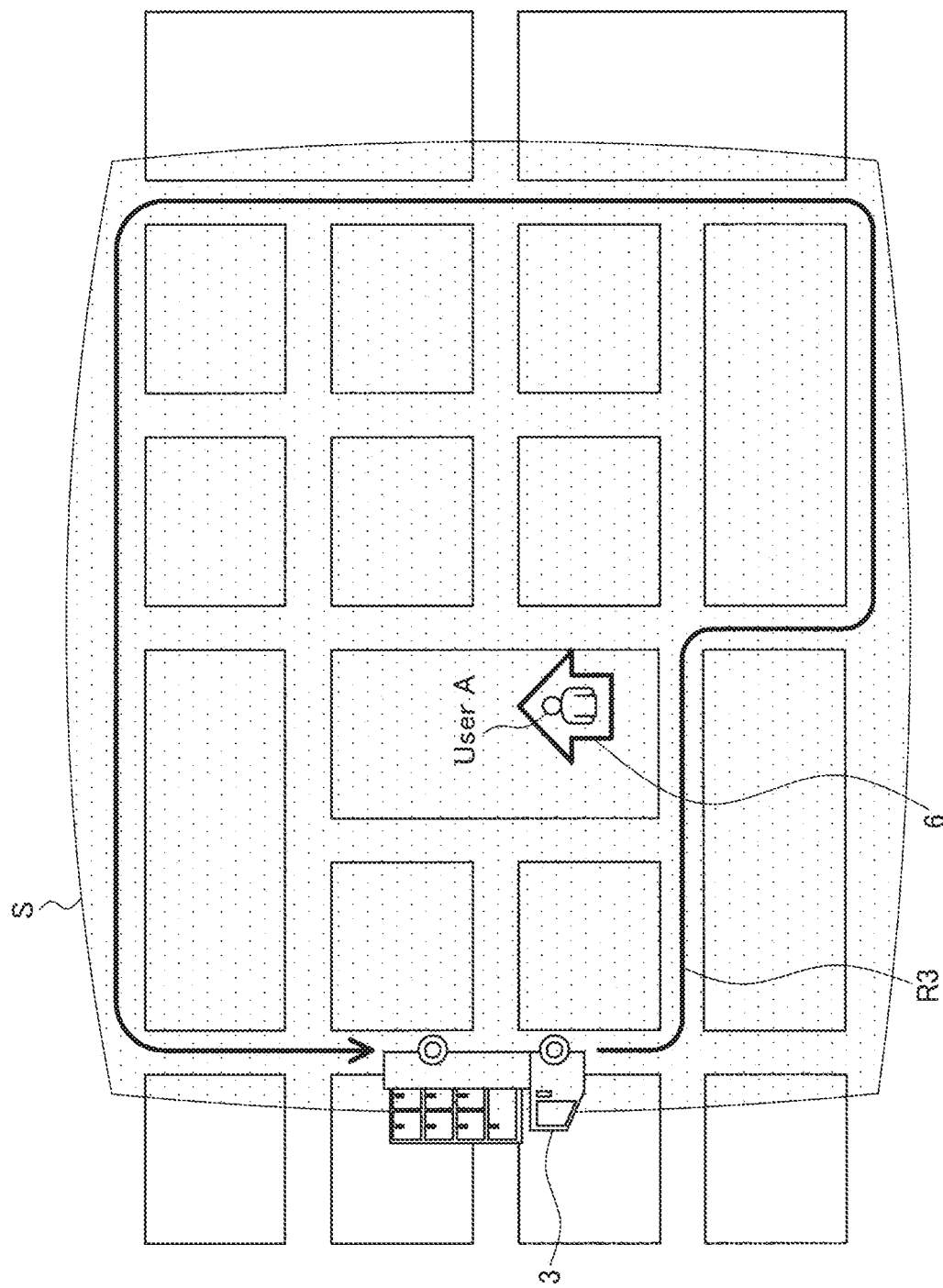
FIG. 12 is a diagram showing an example of a route passing through the vicinity of the current position of the consignee, according to the first practical example.

Next, the home delivery locker vehicle 3 makes control so as to travel the altered route, in conformity with the reroute instruction (step S188). Here, FIG. 12 shows an example of a route R3 passing through the vicinity of the current position of the consignee. As shown in FIG. 12, for example, in a case where user A is present in the specified region S, the going-around route of the home delivery locker vehicle 3 is set to route R3. Note that, although the current position of user A is the home (user A's home 6) in FIG. 12, a route passing through the surroundings of user A can be calculated wherever user A is present in the specified region S.

Further, the server 2 may notify the consignee terminal 4 of the altered route of the home delivery locker vehicle 3 (step S190). The consignee terminal 4 can display the route of the home delivery locker vehicle 3 and the current position of the home delivery locker vehicle 3 to present them to the consignee (step S191).

Figure 13:
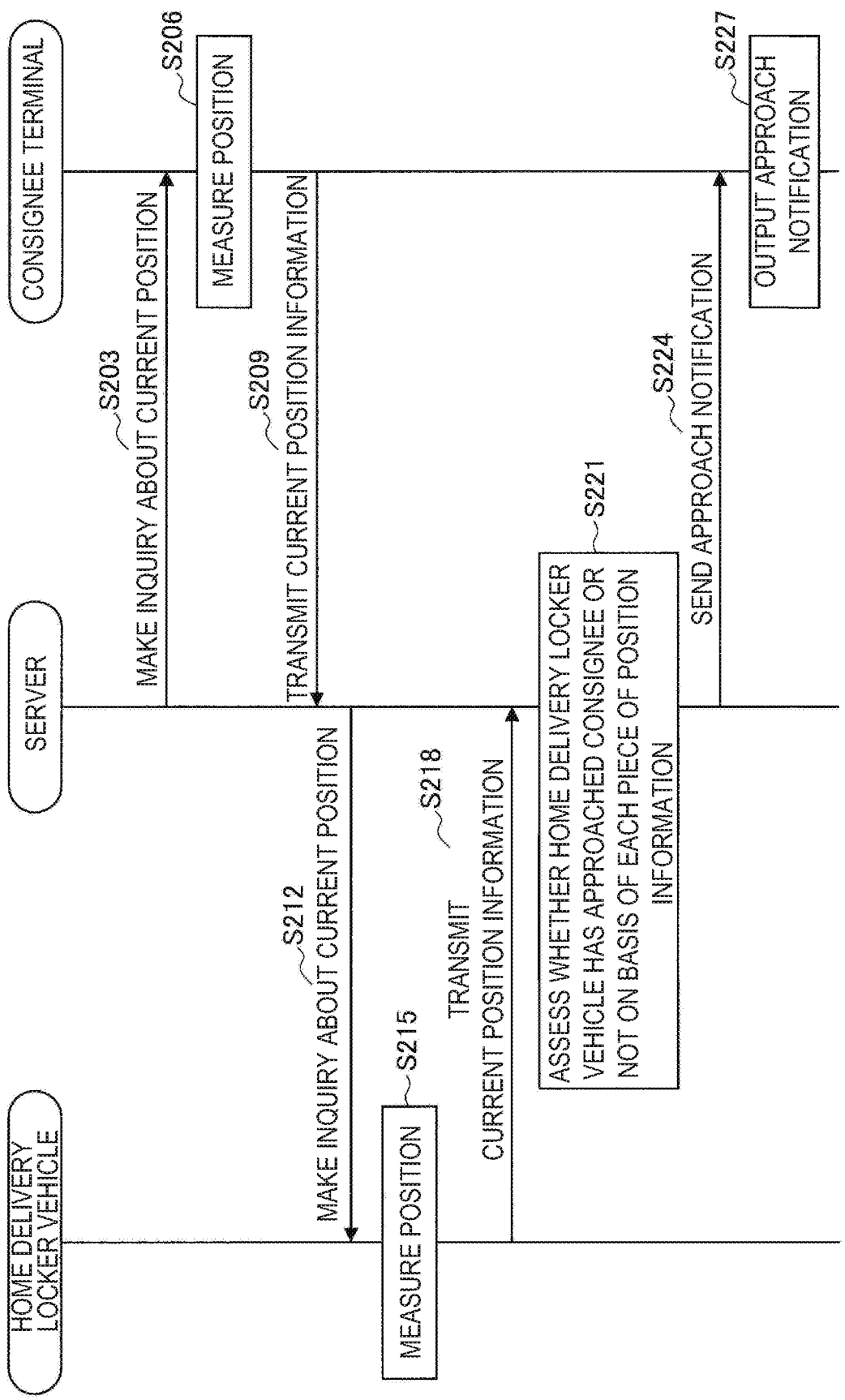
FIG. 13 is a sequence diagram showing operation processing when the home delivery locker vehicle has approached the consignee, according to the first practical example.

FIG. 13 is a sequence diagram showing operation processing when the home delivery locker vehicle 3 has approached the consignee. As shown in FIG. 13, first, the server 2 intermittently performs the acquisition of current position information of the consignee terminal 4 (steps S203 to S209) and the acquisition of current position information of the home delivery locker vehicle 3 (steps S212 to S218).

Next, on the basis of the current position of the consignee terminal 4 and the current position of the home delivery locker vehicle 3, the server 2 assesses whether the home delivery locker vehicle 3 has approached the consignee or not (step S221). The approach distance is not particularly limited, and may be, for example, a distance that allows arrival at the current position of the consignee in approximately 5 minutes, or the like.

Next, in a case where the server 2 has assessed that the home delivery locker vehicle 3 has approached the consignee, the server 2 sends an approach notification to the consignee (step S224).

Next, the consignee terminal 4 presents the approach notification to the user (step S227). Specifically, for example, the consignee terminal 4 outputs the fact that the home delivery locker vehicle 3 in which the home delivery article addressed to the user is loaded is coming close, by voice or display together with an alarm or vibration. In the approach notification, information regarding the home delivery article (the sender, classification, item, time instant of loading, etc., of the home delivery article) may be displayed as well. In a case where the user receives the home delivery article, the user can stop the home delivery locker vehicle 3 and receive the home delivery article, as described next. On the other hand, in a case where the user does not want to receive the home delivery article at the present moment, the user may not stop the home delivery locker vehicle 3 but keep it as it is. Since the home delivery locker vehicle 3 is going around on the rerouted route, an approach notification is transmitted from the server 2 again when the home delivery locker vehicle 3 approaches the user again next time. Thereby, the user can receive at an arbitrary timing, and receipt time is not restrained.

Note that the route passing through the surroundings of the user who is the consignee may be rerouted again under prescribed conditions. For example, in a case where going-around is performed a prescribed number of times or in a case where going-around is performed for a prescribed time, the server 2 may cause the route to return to the steady route or may acquire position information of the consignee again and perform route calculation on the basis of the newest position information. Further, the server 2 may notify the consignee terminal 4 that the route has returned to the steady route. Further, using the consignee terminal 4, the user may request the server 2 to perform rerouting again to a route according to the position of the user.

Figure 14:
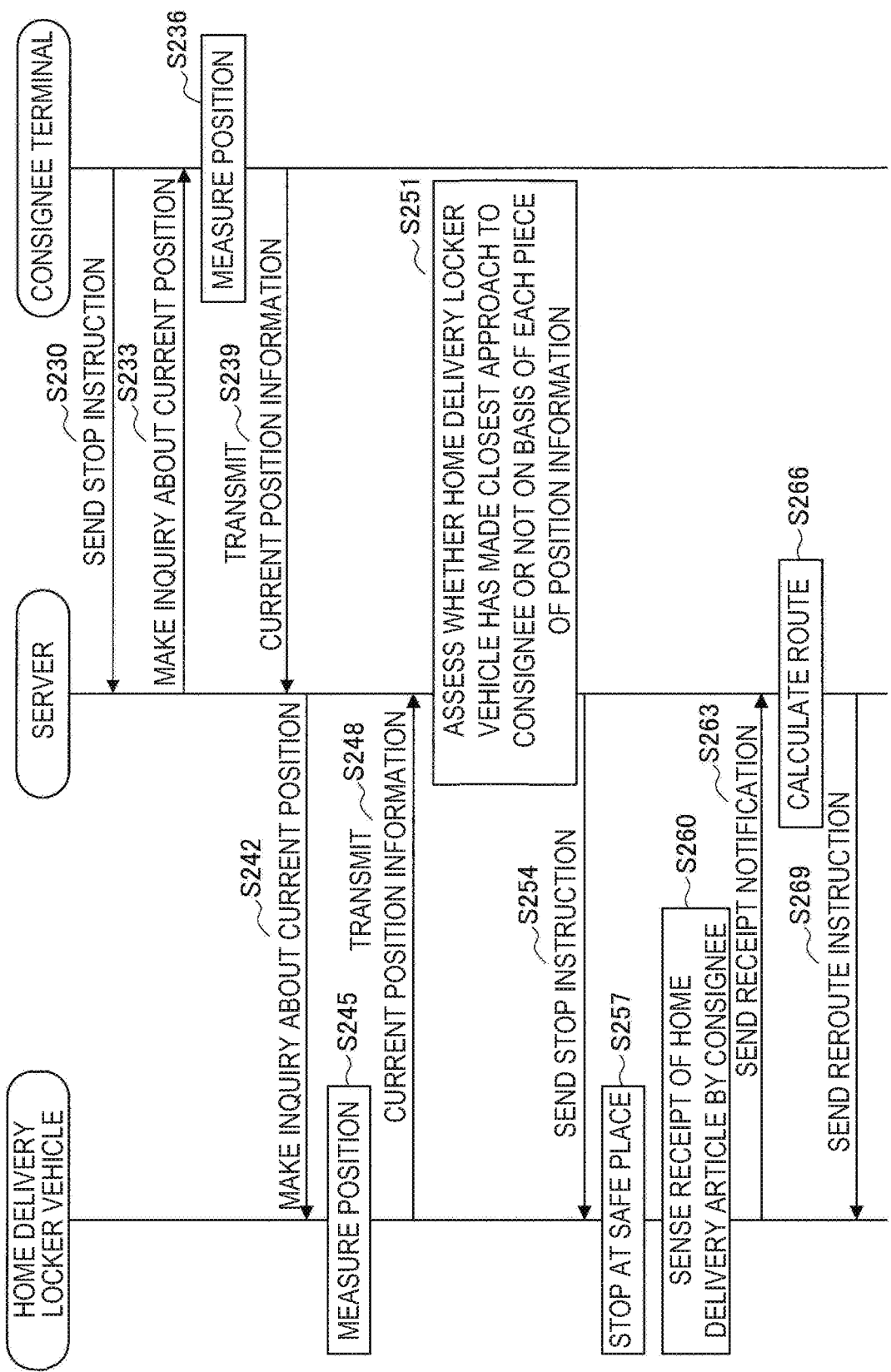
FIG. 14 is a sequence diagram showing operation processing when stopping the home delivery locker vehicle, according to the first practical example.

Next, operation processing when the consignee stops the home delivery locker vehicle 3 is described with reference to FIG. 14. FIG. 14 is a sequence diagram showing operation processing when stopping the home delivery locker vehicle 3.

As shown in FIG. 14, first, the consignee terminal 4 transmits a stop instruction to the server 2 in accordance with a user action (step S230).

Next, the server 2 acquires current position information of the consignee terminal 4 (steps S233 to S239).

Next, the server 2 acquires current position information of the home delivery locker vehicle 3 (steps S242 to S248).

Next, on the basis of the current position of the consignee terminal 4 and the current position of the home delivery locker vehicle 3, the server 2 assesses whether the home delivery locker vehicle 3 has reached closest approach the consignee or not (step S251). The closest approach may be set using distance, or may be set to the nearest place that allows a safe stop around the current position of the user.

Next, in a case where the home delivery locker vehicle 3 has made closest approach to the consignee, the server 2 transmits a stop instruction to the home delivery locker vehicle 3 (step S254).

Next, the home delivery locker vehicle 3 stops at a safe place in accordance with the stop instruction from the server 2 (step S257).

Next, if the home delivery locker vehicle 3 senses the receipt of the home delivery article by the consignee (step S260), the home delivery locker vehicle 3 sends a receipt notification to the server 2 (step S263). For the receipt of the home delivery article, for example, the fact that the locker has been normally unlocked, the fact that the home delivery article has been normally taken out of the interior of the locker, or the like may be sensed by the locker sensor 34. The consignee can normally unlock, from among the lockers mounted on the home delivery locker vehicle 3 that has been stopped, the locker in which the home delivery article addressed to the consignee is loaded, by inputting a prescribed personal identification number or an ID (for example, inserting a prescribed user ID card or transmitting the ID number from the consignee terminal 4), or the like.

Then, if the server 2 receives, from the home delivery locker vehicle 3, the receipt notification showing that the consignee has received the home delivery article, the server 2 newly calculates the route of the home delivery locker vehicle 3 (step S266) and sends a reroute instruction to the home delivery locker vehicle 3 (step S269). Specifically, for example, the server 2 calculates a route returning to the steady route.

3-2. Second Practical Example

Next, a second practical example is specifically described with reference to FIG. 15 to FIG. 17. In the present practical example, in a case where home delivery articles addressed to a plurality of consignees are loaded, current position information of each consignee is acquired. Then, while a going-around route passing through the surroundings of the current positions of consignees present in a specified region is altered, the current positions of other consignees not present in the specified region are also monitored. Then, in a case where any of the other consignees has returned into the specified region, the going-around route is altered again taking account of also the current position of the consignee who has returned.

Figure 15:
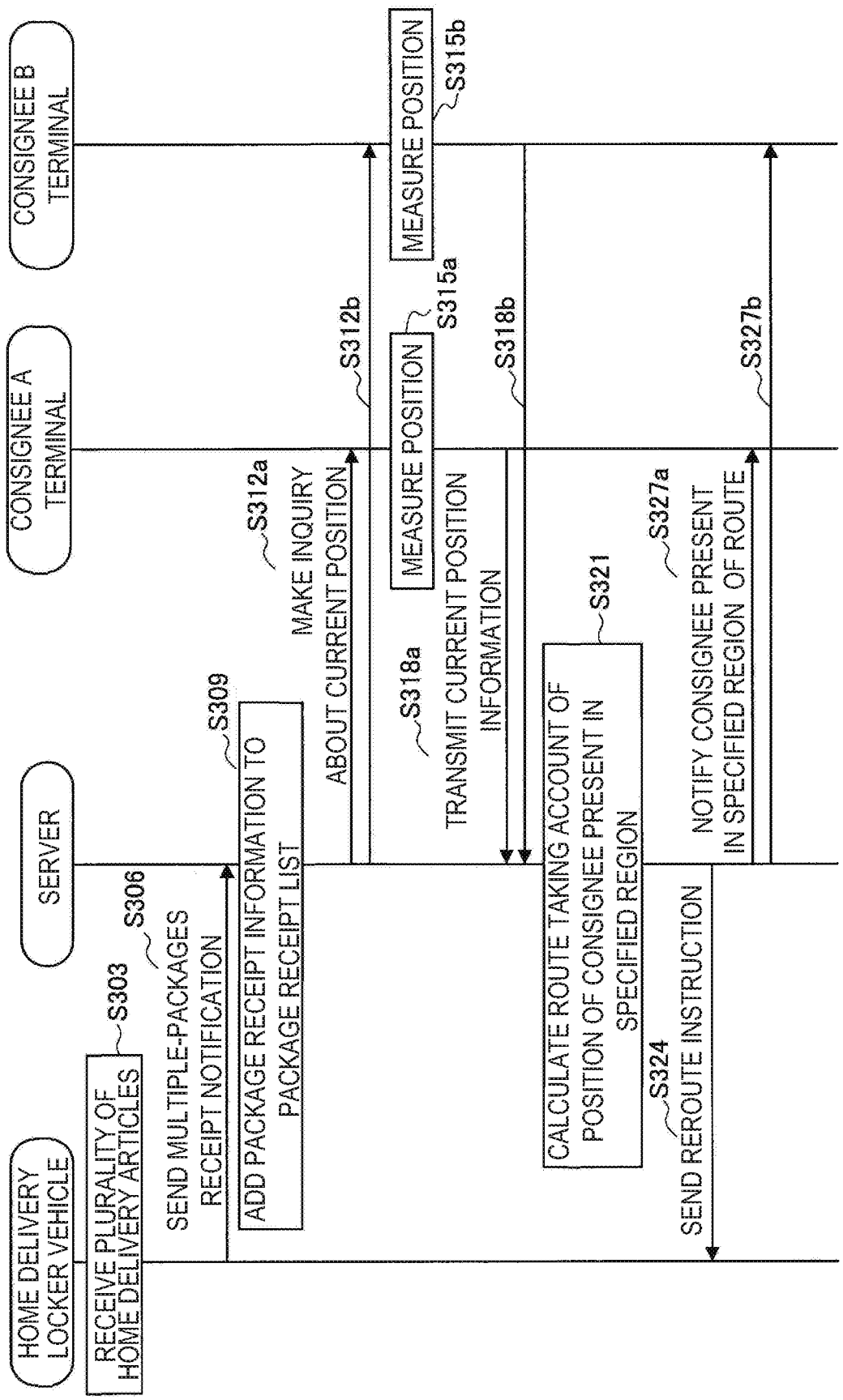
FIG. 15 is a sequence diagram showing operation processing of route calculation according to the positions of a plurality of consignees, according to a second practical example.

Such operation processing according to the second practical example is shown in FIG. 15. FIG. 15 is a sequence diagram showing operation processing of route calculation according to the positions of a plurality of consignees, according to the present practical example.

As shown in FIG. 15, if the home delivery locker vehicle 3 takes home delivery articles addressed to a plurality of consignees (step S303), the home delivery locker vehicle 3 sends a multiple-package receipt notification to the server 2 (step S306). Next, the server 2 adds package receipt information to the package receipt list (step S309).

Next, the server 2 acquires current position information of the plurality of consignees (steps S312a, S312b, S315a, S315b, S318a, and S318b).

Next, the server 2 calculates a going-around route taking account of the current position of a consignee present in a specified region S (that is, a going-around route passing through the surroundings of the current position of the consignee) (step S321).

Then, the server 2 transmits a reroute instruction to the home delivery locker vehicle 3 so that automatic travel is performed in conformity with the calculated new going-around route (step S324). The home delivery locker vehicle 3 performs automatic travel control so as to make a circuit on the altered going-around route, in conformity with the reroute instruction.

Further, the server 2 may notify the consignee present in the specified region S described above of the route of the home delivery locker vehicle 3 (steps S327a and S327b).

Note that, in step S321 described above, in a case where one of the plurality of consignees is present in the specified region S, a going-around route taking account of the position of the one consignee is calculated and a reroute instruction conforming to the going-around route (step S324) and a route notification to the one consignee (step S327) are made. On the other hand, for a consignee present outside the specified region S, the acquisition of position information is continued (steps S312 to S318), and a going-around route is calculated again at the time point when the consignee has returned into the specified region S (step S321). In a case where a plurality of consignees is present in the specified region S at the time point when the consignee has returned into the specified region S, the server 2 calculates a going-around route taking account of the positions of the plurality of consignees and makes a reroute instruction conforming to the going-around route (step S324) and a route notification to the plurality of consignees (step S327).

Figure 16:
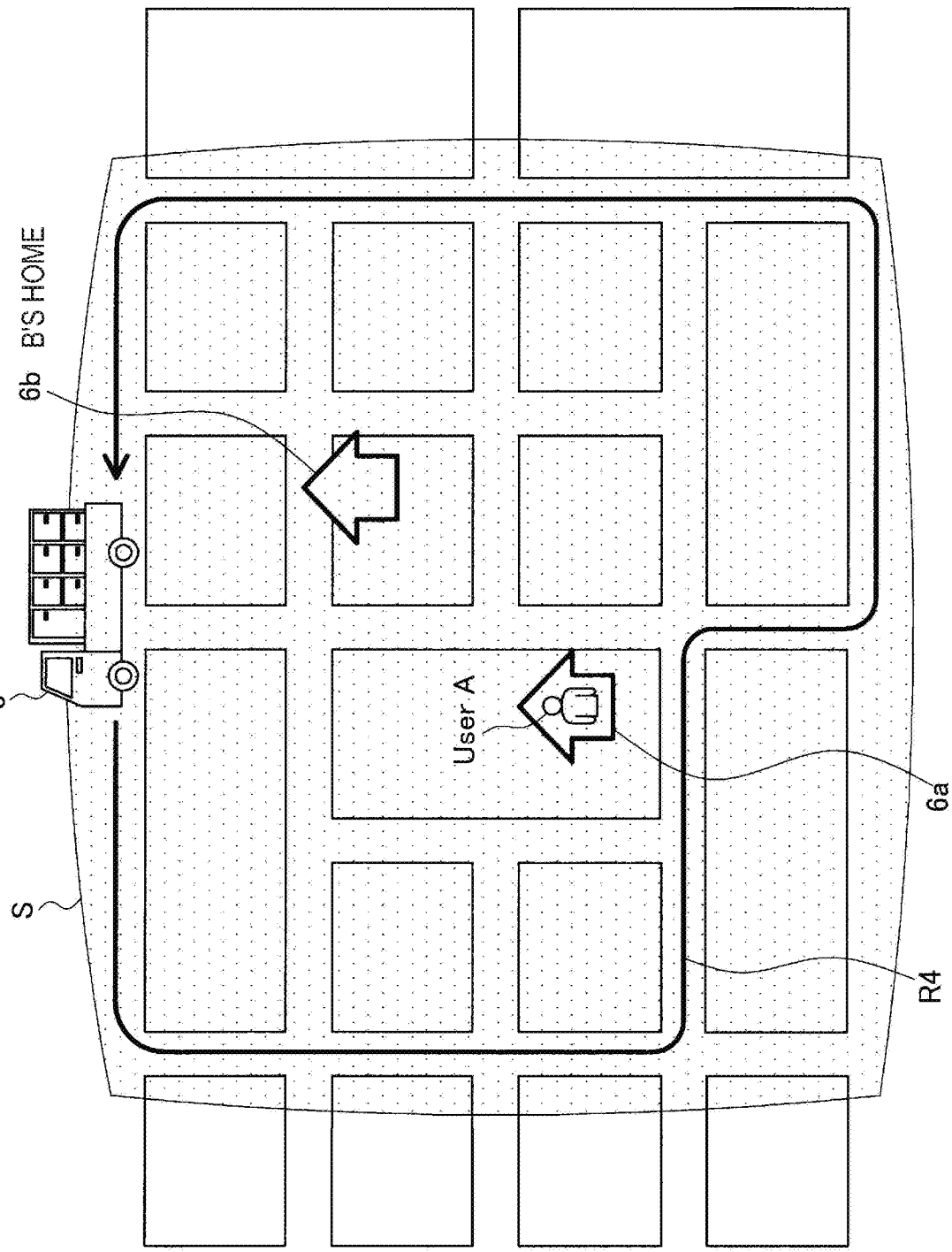
FIG. 16 is a diagram showing an example of route calculation in a case where user A is present in a specified region S, according to the second practical example.
Figure 17:
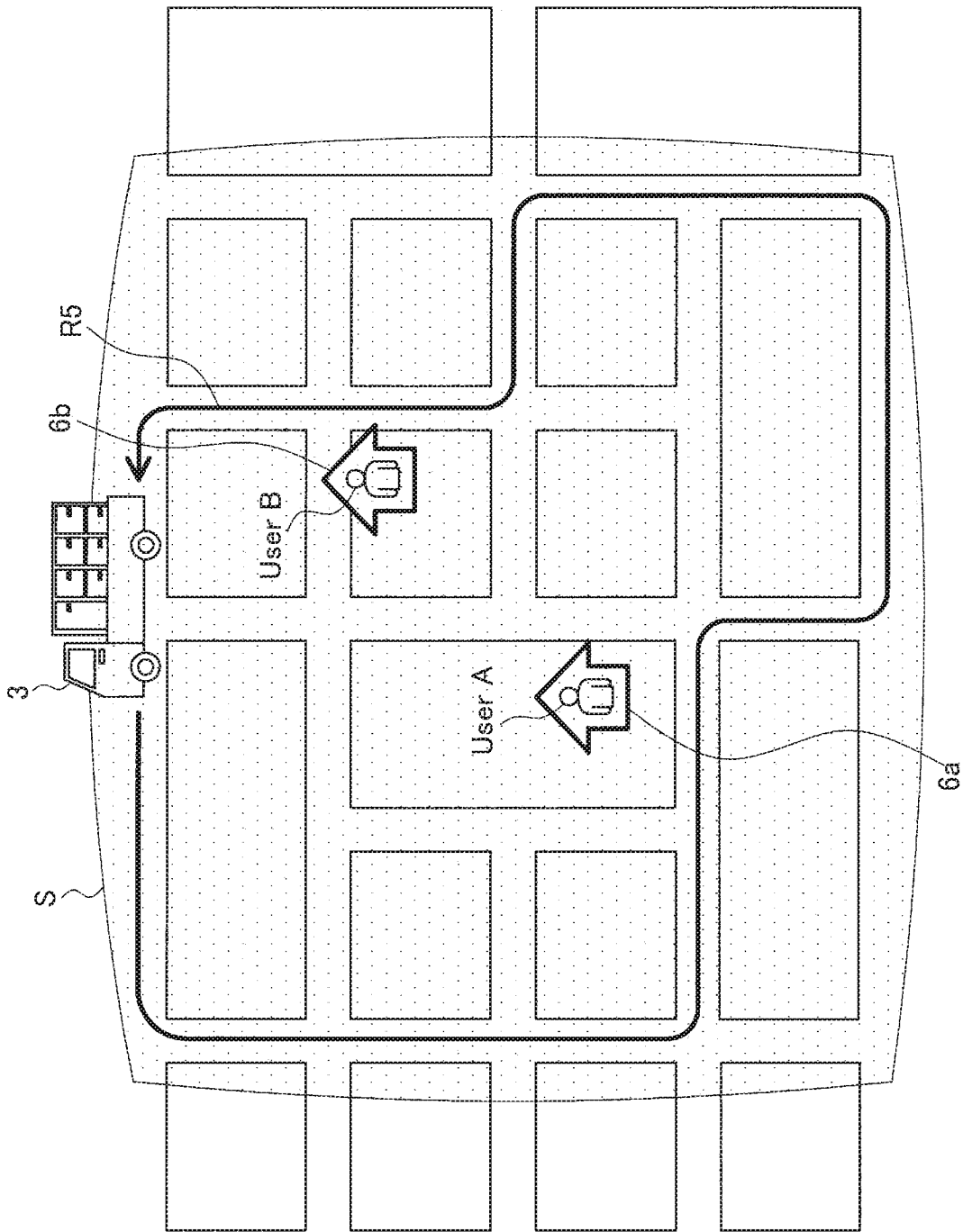
FIG. 17 is a diagram showing an example of route calculation in a case where user A and user B are present in the specified region S, according to the second practical example.

Here, an example of the calculation of a going-around route according to the current positions of a plurality of consignees is described using FIG. 16 and FIG. 17. Herein, a case where user A and user B live in a specified region S, and a home delivery article addressed to user A and a home delivery article addressed to user B are loaded in the home delivery locker vehicle 3 is described.

FIG. 16 is a diagram showing an example of route calculation in a case where user A is present in the specified region S. As shown in FIG. 16, in a case where user A is present in, for example, user A's home 6a in the specified region S and on the other hand user B is absent in the specified region S, the server 2 calculates a route R4 passing through the surroundings of user A's home 6a, and controls the home delivery locker vehicle 3.

Next, FIG. 17 is a diagram showing an example of route calculation in a case where user A and user B are present in the specified region S. In a case where user B has returned into the specified region S and is present in, for example, user B's home 6b, the server 2 calculates a route R5 passing through the surroundings of user A's home 6a and user B's home 6b, and controls the home delivery locker vehicle 3, as shown in FIG. 17.

Hereinabove, a specific example of route calculation is described.

Operation processing when the home delivery locker vehicle 3 has approached each user as well as the action of stopping the home delivery locker vehicle 3 and the receipt of the home delivery article by each user are similar to those in the first practical example described with reference to FIG. 13 to FIG. 14.

3-3. Third Practical Example

Next, a third practical example is specifically described with reference to FIG. 18 and FIG. 19. In the present practical example, control is made such that, at the timing when a consignee has just returned to the home, the home delivery locker vehicle 3 arrives in front of the home. Thereby, the consignee can receive a home delivery article at the timing of returning home. In each practical example described above, the travel of the home delivery locker vehicle 3 does not take account of the timing of returning-home of a consignee; hence, for example, it has been necessary that, when the home delivery locker vehicle 3 is going around in the vicinity of the home, the consignee go out of the house to receive a home delivery article or stop the home delivery locker vehicle 3 somewhere in the specified region for receipt. In contrast, in the present practical example, receipt is possible at the timing of returning home, and convenience is high.

Such a receipt method according to the third practical example is referred to as "easy receipt" in the present specification. This is because a user can receive a home delivery article in front of the home when the user has returned home from the outside, and time and effort, such as going out of the interior of the house again in agreement with the time of home delivery, can be saved and easy receipt becomes possible. In a case where the user demands "easy receipt" in advance (for example, in a case where the user requests easy receipt as an additional service), the server 2 calculates a route on the basis of current position information of the user in such a manner that the home delivery locker vehicle 3 arrives in front of the home when the user returns home. In the following, a specific description is given with reference to FIG. 18 and FIG. 19.

Figure 18:
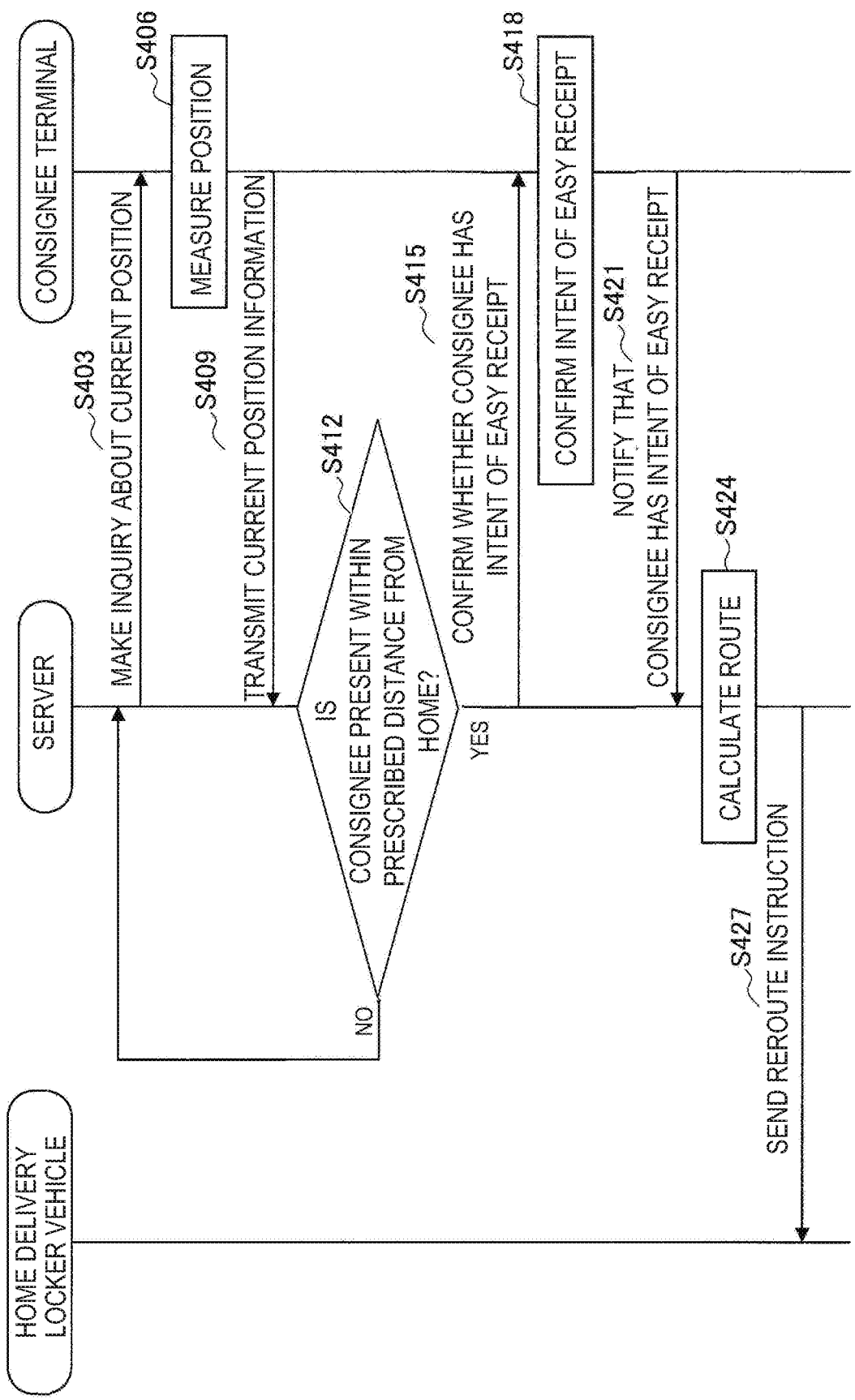
FIG. 18 is a sequence diagram showing operation processing of easy receipt service according to a third practical example.

FIG. 18 is a sequence diagram showing operation processing of easy receipt service according to the present practical example. The processing shown in FIG. 18 shows processing after a home delivery article addressed to a user is loaded into the home delivery locker vehicle 3.

As shown in FIG. 18, first, the server 2 acquires current position information from the consignee terminal 4 of the consignee of the loaded home delivery article (steps S403 to S409).

Next, the server 2 assesses whether the consignee is present within a prescribed distance from the home or not (step S412). For example, the area of 3 km from the home is possible. Note that, although herein a "prescribed distance" is taken as an example, the present practical example is not limited to this, and it is also possible to assess whether the time of movement from the current place of the consignee to the home (the time of returning home) has come within a prescribed time or not.

Next, the server 2 confirms whether the consignee has the intent of easy receipt (steps S415 and S418). In a case where the server 2 has received a notification that the consignee has the intent of receipt (step S421), the server 2 calculates a route that allows the home delivery locker vehicle 3 to arrive in the vicinity of the home of the consignee at the timing when the consignee returns home (step S424). Details of such route calculation are described later with reference to FIG. 19. Note that, in a case of a user from which a request for easy receipt service (for example, fee-based service) is made and registered in advance, route calculation may be performed without confirming the intent of easy receipt.

Then, the server 2 transmits a reroute instruction to the home delivery locker vehicle 3 (step S427). The home delivery locker vehicle 3 makes control so as to travel on the altered route, in conformity with the reroute instruction.

Next, route calculation according to the present practical example is described with reference to FIG. 19. FIG. 19 is a flow chart showing operation processing of route calculation of easy receipt service according to the present practical example.

Figure 19:
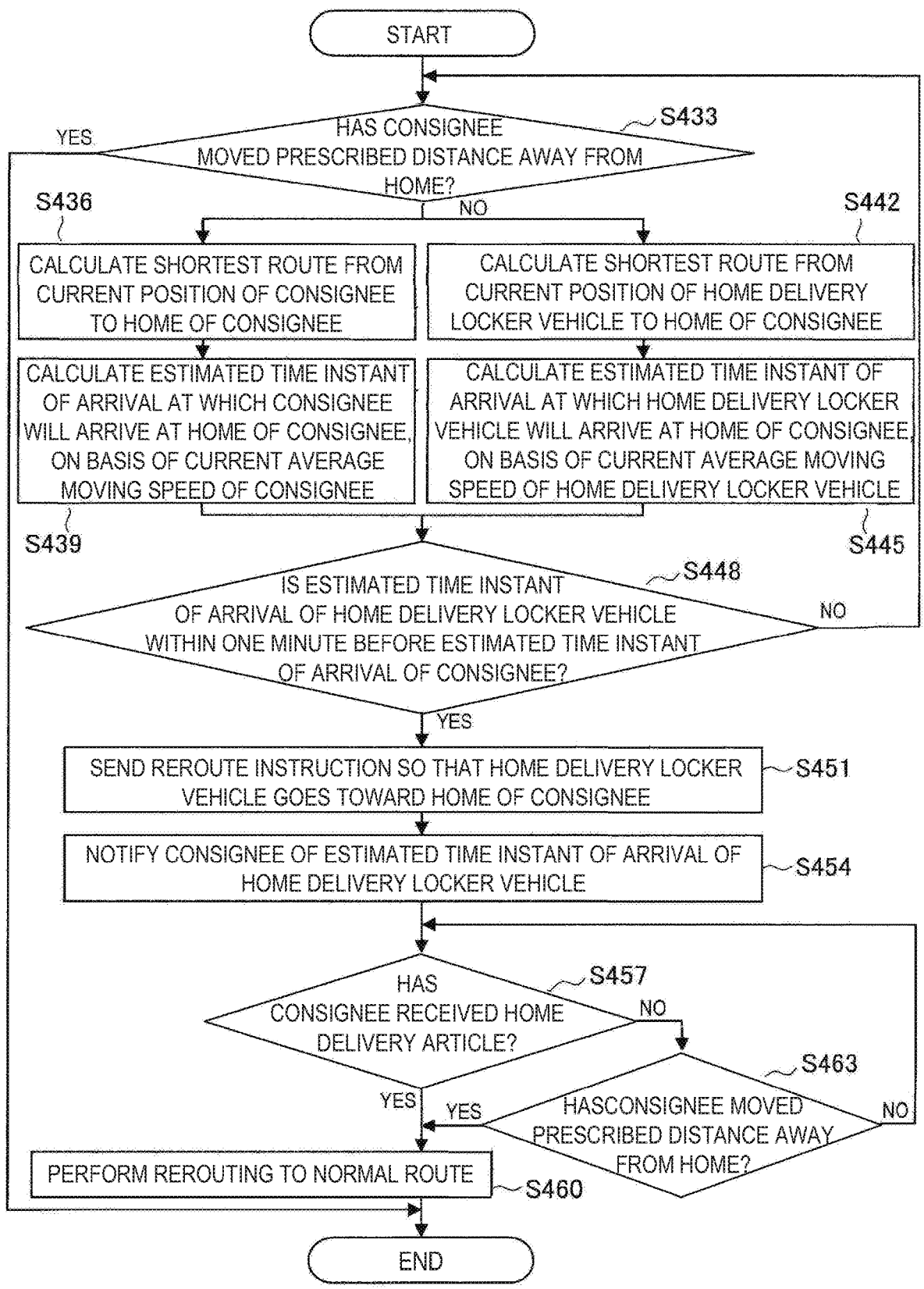
FIG. 19 is a flow chart showing operation processing of route calculation of easy receipt service according to the third practical example.

As shown in FIG. 19, first, in a case where the consignee has moved a prescribed distance away from the home (step S433/Yes), route calculation of easy receipt service ends. This is because it is envisaged that the user is not on the way home. The case of having moved a prescribed distance may be, for example, a case of having moved more than or equal to 4 km away from the home. Note that, in a case where the consignee has come within the prescribed distance from the home again, operation processing of easy receipt service may be resumed.

Next, in a case where the consignee is within the prescribed distance from the home (step S433/No), the server 2 calculates the shortest route running from the current position of the consignee to the home (step S436), and calculates the estimated time instant of arrival at which the consignee will arrive at the home, on the basis of the distance of the calculated shortest route and the current average moving speed of the consignee (step S439).

Further, the server 2 calculates the shortest route running from the current position of the home delivery locker vehicle 3 to the home of the consignee (step S442), and calculates the estimated time instant of arrival at which the home delivery locker vehicle 3 will arrive at the home of the consignee, on the basis of the distance of the calculated shortest route and the current average moving speed of the home delivery locker vehicle 3 (step S445).

Next, it is assessed whether the estimated time instant of arrival of the home delivery locker vehicle 3 is within one minute before the estimated time instant of arrival of the consignee or not (step S448). The reason why the condition that the arrival of the home delivery locker vehicle 3 be within one minute before the arrival of the consignee is employed is that it is intended to avoid a state where the consignee waits for the home delivery locker vehicle 3 in front of the home. Note that the time condition is not limited to this, and may be, for example, within 1 to 5 minutes before the arrival of the consignee. Further, as shown in step S412 of FIG. 18, in the present practical example, route calculation of easy receipt service is performed in a case where the consignee is present within a prescribed distance (for example, within the range of 3 km) from the home. Such a distance may be set to a distance at which it is highly likely that the home delivery locker vehicle 3 will be in time for the time of returning-home of the consignee, from anywhere in the going-around region of the home delivery locker vehicle 3, in view of the area of the going-around region, as appropriate. Therefore, in a case where the going-around region is larger, the distance is larger.

Next, the server 2 transmits a reroute instruction (the shortest route to the home of the consignee) to the home delivery locker vehicle 3 so that the home delivery locker vehicle 3 goes toward the home of the consignee (step S451).

Next, the server 2 notifies the consignee of the estimated time instant of arrival of the home delivery locker vehicle 3 (step S454).

Next, in a case where the server 2 has checked that the home delivery article has been received by the consignee (step S457/Yes), the server 2 transmits a reroute instruction to the home delivery locker vehicle 3 so that the home delivery locker vehicle 3 returns to the steady route (step S460). The receipt of the home delivery article by the consignee can be checked by a receipt notification from the home delivery locker vehicle 3. The consignee can, on returning home, receive the home delivery article from the home delivery locker vehicle 3 that has arrived at the surroundings of the home. Further, in a case where a demand for cancellation is made by the consignee, the server 2 may cause the home delivery locker vehicle 3 to return to the state of steady going-around route travel.

Further, in a case where the consignee has moved the prescribed distance away from the home (step S463/Yes), the server 2 ends the processing of easy receipt service, and performs rerouting to the steady route (step S460). This is because it is envisaged that the user is not on the way home. The case of having moved a prescribed distance may be, for example, a case of having moved more than or equal to 4 km away from the home. Note that, in a case where the consignee has come within the prescribed distance from the home again, operation processing of easy receipt service may be resumed.

Hereinabove, route calculation in easy receipt service according to the third practical example is specifically described. Note that, although the example described above employs the condition of arrival at the home of the consignee within one minute before the estimated time instant of arrival of the consignee through the shortest route, the present practical example is not limited to this. For example, the server 2 may not necessarily use the shortest route, and may calculate the travel route of the home delivery locker vehicle 3 to the home of the consignee in such a manner that the home delivery locker vehicle 3 arrives several minutes before the estimated time instant of arrival of the consignee.

Further, the server 2 may perform rerouting to a going-around route on which the home delivery locker vehicle 3 passes through the surroundings of the home at the time point when the consignee has come within a prescribed distance (for example, within the range of 3 km) from the home (an example of a sending destination) (or at the time point when further it is confirmed that the consignee has the intent of easy receipt).

Further, the server 2 may intermittently check the positions of the home delivery locker vehicle 3 and the consignee. In a case where the home delivery locker vehicle 3 is likely to be late for the estimated time instant of returning-home of the consignee, the server 2 may notify the consignee terminal 4 of this situation; and, in a case where cancellation is made by the consignee, the server 2 may perform rerouting to the steady route or a going-around route passing through the surroundings of the home.

4. MODIFICATION EXAMPLES

Next, modification examples of the present embodiment are described.

In a case where, for example, a plurality of requests for easy receipt service is accepted as a modification example of easy receipt service according to the third practical example described above, a drone (a small-sized unmanned plane) may be dispatched from the home delivery locker vehicle 3, and the drone may stand by in front of the home in agreement with the timing of returning-home of each consignee so as to deliver a package. Such drone delivery is not limited to the third practical example, and delivery by a drone from the home delivery locker vehicle 3 may be requested as an optional service, for example. Note that the unmanned transporter that can be dispatched from the home delivery locker vehicle 3 is not limited to a flight type such as a drone, and may be a running type.

Further, although the third practical example described above describes the receipt of a home delivery article in front of the home of the consignee, the present embodiment is not limited to this and also a ski site, an event venue, an accommodation facility, etc., are possible, and the sending destination of the home delivery article is not limited to the home of the consignee. Further, in the first and second practical examples described above, similarly the sending destination of the home delivery article is not limited to the home of the consignee either, and a going-around route may be calculated in accordance with whether the consignee is present in a specified region of the sending destination or not.

Further, although, in each practical example described above, the consignee is notified of the going-around route of the home delivery locker or an approach notification is sent to the consignee, these notifications are not indispensable.

Further, the home delivery locker vehicle 3 is not limited to use in delivery by home delivery agents, and a package from an individual to an individual may be loaded and a package for which home delivery is requested from an individual to a home delivery agent may be loaded.

Further, in a case of home delivery not particularly in a hurry, a home delivery article can be delivered to the target region by causing home delivery locker vehicles of regions to cooperate together. For example, if a package addressed to user E living in an E town is loaded into a home delivery locker vehicle of a C town, the home delivery locker vehicle of the C town meets a home delivery locker vehicle of a neighboring D town on the way of the going-around route, and moves, to the home delivery locker vehicle of the D town, the home delivery locker in which the package addressed to user E is put, for example. Next, the home delivery locker vehicle of the D town meets a home delivery locker vehicle of the neighboring E town on the way of the going-around route of the D town, and moves, to the home delivery locker vehicle of the E town, the home delivery locker in which the package addressed to user E is put, for example (it is also possible to automatically replace the locker with an empty locker of the home delivery locker vehicle of the E town). In this way, the package addressed to user E can be successively transferred to the home delivery locker vehicle of the E town. The replacement of lockers may be performed by, for example, exchanging moving bodies having a standardized size, such as drones or small-sized carts, between home delivery locker vehicles.

Further, since the home delivery locker vehicle 3 goes around in a region, the home delivery locker vehicle 3 may be equipped with the functions of illumination, signage, and/or cameras, etc., so as to serve also for crime prevention of the region.

Further, in underpopulated areas or the like, the home delivery locker vehicle 3 may be used as part of movable convenience service. For example, the home delivery locker vehicle 3 may have also the functions of a mailbox, an automatic teller machine (ATM), etc., as well as selling commodities.

5. CONCLUSIONS

As described above, in an information processing system according to an embodiment of the present disclosure, the number of redeliveries is reduced by using an automatic home delivery locker vehicle that goes around in a region, and the convenience of delivery service can be improved.

The preferred embodiment(s) of the present disclosure has/have been described above with reference to the accompanying drawings, whilst the present technology is not limited to the above examples. A person skilled in the art may find various alterations and modifications within the scope of the appended claims, and it should be understood that they will naturally come under the technical scope of the present disclosure.

For example, it is also possible to create a computer program for causing hardware devices such as a CPU, a ROM, and a RAM enclosed in the home delivery agent terminal 1, the server 2, the home delivery locker vehicle 3, or the consignee terminal 4 described above to exhibit the function of the home delivery agent terminal 1, the server 2, the home delivery locker vehicle 3, or the consignee terminal 4. Further, also a computer-readable storage medium in which the computer program is caused to be stored is provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control system configured to manage running of an automatic driving home delivery locker going around in a specified region by automatic driving, the control system including:
  a communication unit configured to receive notification showing that the automatic driving home delivery locker has received a home delivery article; and
  a control unit configured to make control such that an inquiry is made to a terminal device of a consignee of the home delivery article via the communication unit in accordance with reception of the notification so as to estimate a current position of the consignee, and when the consignee is in the specified region, a new running path on which the automatic driving home delivery locker travels a vicinity of the current position of the consignee or a sending destination of the home delivery article is generated and is transmitted to the automatic driving home delivery locker via the communication unit.

(2)

The control system according to (1),
  in which the control unit makes control such that the new running path is transmitted to the automatic driving home delivery locker and the consignee via the communication unit.

(3)

The control system according to (1) or (2), in which the control unit makes control such that
  the current position of the consignee and a current position of the automatic driving home delivery locker are intermittently received via the communication unit, and
  the consignee is notified of an approach of the automatic driving home delivery locker when the automatic driving home delivery locker has approached the consignee.

(4)

The control system according to (1), in which, when a plurality of home delivery articles is loaded in the automatic driving home delivery locker,
  the control unit makes control such that
  inquiries are intermittently made to terminal devices of a plurality of consignees corresponding to the plurality of home delivery articles via the communication unit, and current positions of the plurality of consignees are monitored, and
  a new running path is generated in accordance with the current positions of the plurality of consignees and is transmitted to the automatic driving home delivery locker via the communication unit.

(5)

The control system according to (4), in which the control unit makes control such that when the current position of one consignee among the plurality of consignees is in the specified region and the current position of another consignee is outside the specified region, a new running path that allows travelling a vicinity of the current position of the one consignee or a sending destination of the home delivery article is generated and is transmitted to the automatic driving home delivery locker via the communication unit, and if a fact that the other consignee has returned to the specified region is sensed, a new running path that allows travelling a vicinity of the current position of the other consignee or a sending destination of the home delivery article is generated and is transmitted to the automatic driving home delivery locker via the communication unit.

(6)

The control system according to (1), in which the control unit makes control such that inquiries are intermittently made to the terminal device of the consignee of the home delivery article via the communication unit, and the current position of the consignee is monitored, and a new running path on which the automatic driving home delivery locker travels the vicinity of the sending destination of the home delivery article at a time instant when the consignee almost arrives at the sending destination of the home delivery article is generated and is transmitted to the automatic driving home delivery locker via the communication unit.

(7)

The control system according to (6), in which the control unit makes control such that when the consignee is on a way home and comes within a prescribed distance from a dwelling place or within a prescribed time before returning home, intent of the consignee of the home delivery article to receive the home delivery article is confirmed with the consignee via the communication unit, and in a case where the consignee has the intent of receipt, a new running path on which the automatic driving home delivery locker travels the vicinity of the sending destination of the home delivery article at a time instant when the consignee almost arrives at the sending destination of the home delivery article is generated and is transmitted to the automatic driving home delivery locker via the communication unit.

(8)

The control system according to (6) or (7), in which the control unit makes control such that in a case where the consignee is a registered member, a new running path on which the automatic driving home delivery locker travels the vicinity of the sending destination of the home delivery article at a time instant when the consignee arrives at the sending destination of the home delivery article is generated and is transmitted to the automatic driving home delivery locker via the communication unit.

(9)

The control system according to any one of (1) to (8), in which the control unit makes control such that in accordance with a request from the consignee received via the communication unit, a running path on which an unmanned transporter standing by in the automatic driving home delivery locker runs to a vicinity of the current position of the consignee or a sending destination place of the home delivery article is generated and is transmitted to the unmanned transporter via the communication unit.

(10)

The control system according to any one of (1) to (9), in which the automatic driving home delivery locker carries a purchasable commodity.

(11)

The control system according to any one of (1) to (10), in which the control unit, in accordance with a request from a terminal device of a home delivery agent, makes control such that a meeting point for the automatic driving home delivery locker and the home delivery agent in the specified region is settled on the basis of a current position of the automatic driving home delivery locker and a current position of the home delivery agent, information of the settled meeting point is transmitted to the terminal device of the home delivery agent via the communication unit, and makes control such that a new running path leading to the settled meeting point is generated and is transmitted to the automatic driving home delivery locker via the communication unit.

(12)

The control system according to any one of (1) to (11), in which the control unit makes control such that in a case where a request for stopping is received from the consignee in response to notification that the automatic driving home delivery locker has approached the consignee, a control signal of an instruction to stop travel is transmitted to the automatic driving home delivery locker.

(13)

A control method that manages running of an automatic driving home delivery locker going around in a specified region by automatic driving, the control method including:

receiving, a processor via a communication unit, notification showing that the automatic driving home delivery locker has received a home delivery article, and making control, by the processor, such that an inquiry is made to a terminal device of a consignee of the home delivery article via the communication unit in accordance with reception of the notification so as to estimate a current position of the consignee, and when the consignee is in the specified region, a new running path on which the automatic driving home delivery locker travels a vicinity of the current position of the consignee or a sending destination of the home delivery article is generated and is transmitted to the automatic driving home delivery locker via the communication unit.

REFERENCE SIGNS LIST

1 Home delivery agent terminal
2 Server
3 Home delivery locker vehicle
4 Consignee terminal
5 Home delivery agent vehicle
6a User A's home
6b user B's home
10 Control unit
11 Communication unit
12 Input unit
13 Position measurement unit
14 Display unit
15 Storage unit
20 Control unit
201 Running control unit
202 Package management unit
203 Position information management unit
21 Communication unit 22 Storage unit
221 Package receipt list storage unit
222 Position information storage unit
223 User information storage unit
30 Control unit
301 Automatic driving control unit
302 Locker management unit
31 Communication unit
32 Position measurement unit
33 In-vehicle sensor
34 Locker sensor
35 Driving unit
36 Storage unit
361 Locker state storage unit
40 Control unit
41 Communication unit
42 Input unit
43 Position measurement unit
44 Display unit
45 Storage unit

What is claimed is:

1. A control system, comprising:
processing circuitry configured to:
control transmission of an inquiry to a terminal device of a first consignee of a first home delivery article based on a reception of a first notification, wherein the first notification indicates reception of the first home delivery article by an automatic driving home delivery locker vehicle, and
the automatic driving home delivery locker vehicle runs by automatic driving;
estimate a current position of the first consignee based on the transmission of the inquiry;
calculate a first running path on which the automatic driving home delivery locker vehicle travels a vicinity of the current position of the first consignee, wherein the first running path is calculated based on the current position of the first consignee;
transmit the calculated first running path to the automatic driving home delivery locker vehicle;
control the automatic driving home delivery locker vehicle to switch a route from a specific steady route to the calculated first running path based on the transmitted calculated first running path;
calculate, based on a specific request from a second consignee, a second running path on which the automatic driving home delivery locker vehicle travels through a vicinity of a sending destination of a second home delivery article within a specific time interval before the second consignee arrives at the sending destination of the second home delivery article, wherein the second consignee receives the second home delivery article before the second consignee arrives at the sending destination of the second home delivery article; and
transmit the calculated second running path to the automatic driving home delivery locker vehicle.

2. The control system according to claim 1, wherein
the processing circuitry is further configured to transmit, based on a receipt notification of the first home delivery article to the first consignee, a reroute instruction to the automatic driving home delivery locker vehicle; and
the reroute instruction corresponds to an instruction to return to the specific steady route.

3. The control system according to claim 1, wherein the processing circuitry is further configured to transmit the second running path to the second consignee.

4. The control system according to claim 1, wherein the processing circuitry is further configured to:
estimate a current position of the second consignee;
receive a current position of the automatic driving home delivery locker vehicle; and
notify the second consignee of an approach of the automatic driving home delivery locker vehicle based on the automatic driving home delivery locker vehicle that has approached the second consignee.

5. The control system according to claim 1, wherein based on the second consignee is on a way home and comes within a specific distance from a dwelling place, the processing circuitry is further configured to:
confirm intent of the second consignee to receive the second home delivery article;
calculate, based on the second consignee having the intent of receipt, the second running path on which the automatic driving home delivery locker vehicle travels through the vicinity of the sending destination of the second home delivery article at a time instant at which the second consignee arrives at the sending destination of the second home delivery article; and
transmit the calculated second running path to the automatic driving home delivery locker vehicle.

6. The control system according to claim 1, wherein the processing circuitry is further configured to:
receive a request from the first consignee;
calculate the first running path on which an unmanned transporter runs to the vicinity of the current position of the first consignee; and
transmit the calculated first running path to the unmanned transporter.

7. The control system according to claim 1, wherein the automatic driving home delivery locker vehicle carries a purchasable commodity.

8. The control system according to claim 1, wherein the processing circuitry is further configured to:
settle a meeting point for the automatic driving home delivery locker vehicle and a home delivery agent based on a request from a terminal device of the home delivery agent, a current position of the automatic driving home delivery locker vehicle, and a current position of the home delivery agent;
transmit information of the settled meeting point to the terminal device of the home delivery agent;
calculate a new running path based on the settled meeting point; and
transmit the calculated new running path to the automatic driving home delivery locker vehicle.

9. The control system according to claim 1, wherein the processing circuitry is further configured to:
control transmission of a second notification to the first consignee, wherein the second notification indicates that the automatic driving home delivery locker vehicle has approached the first consignee;
receive, based on the transmitted second notification, a request from the first consignee to stop the automatic driving home delivery locker vehicle; and
transmit, to the automatic driving home delivery locker vehicle, a control signal of an instruction to stop automatic driving of the automatic driving home delivery locker vehicle.

10. A control method, comprising:
controlling transmission, by a processing circuitry, of an inquiry to a terminal device of a first consignee of a first home delivery article based on a reception of a notification, wherein the notification indicates reception of the first home delivery article by an automatic driving home delivery locker vehicle, and the automatic driving home delivery locker vehicle runs by automatic driving;

estimating, by the processing circuitry, a current position of the first consignee based on the transmission of the inquiry;

calculating, by the processing circuitry, a first running path on which the automatic driving home delivery locker vehicle travels a vicinity of the current position of the first consignee, wherein the first running path is calculated based on the current position of the first consignee;

transmitting, by the processing circuitry, the calculated first running path to the automatic driving home delivery locker vehicle, wherein the automatic driving of the automatic driving home delivery locker vehicle is controlled based on the transmitted calculated first running path;

switching a route of the automatic driving home delivery locker vehicle from a specific steady route to the calculated first running path based on the transmitted calculated first running path;

calculating, by the processing circuitry, a second running path on which the automatic driving home delivery locker vehicle travels through a vicinity of a sending destination of a second home delivery article within a specific time interval before a second consignee arrives at the sending destination of the second home delivery article, wherein the calculation of the second running path is based on a specific request from the second consignee, and the second consignee receives the second home delivery article before the second consignee arrives at the sending destination of the second home delivery article; and transmitting, by the processing circuitry, the calculated second running path to the automatic driving home delivery locker vehicle.

* * * * *